(12) United States Patent
Padovani et al.

(10) Patent No.: US 9,436,286 B2
(45) Date of Patent: Sep. 6, 2016

(54) METHOD AND APPARATUS FOR TRACKING ORIENTATION OF A USER

(75) Inventors: Niccolo A. Padovani, San Diego, CA (US); David Jonathan Julian, San Diego, CA (US); Virginia Walker Keating, San Diego, CA (US); Rinat Burdo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/078,400

(22) Filed: Apr. 1, 2011

(65) Prior Publication Data

US 2012/0172126 A1    Jul. 5, 2012

Related U.S. Application Data

(60) Provisional application No. 61/430,007, filed on Jan. 5, 2011.

(51) Int. Cl.
| | | |
|---|---|---|
| *A63F 9/24* | (2006.01) | |
| *G06F 3/01* | (2006.01) | |
| *G06F 3/03* | (2006.01) | |

(52) U.S. Cl.
CPC .............. *G06F 3/017* (2013.01); *G06F 3/011* (2013.01); *G06F 3/0304* (2013.01)

(58) Field of Classification Search
USPC .......................................... 463/8, 36, 37, 12
See application file for complete search history.

(56) References Cited

U.S. PATENT DOCUMENTS

| | | | |
|---|---|---|---|
| 5,616,078 A * | 4/1997 | Oh ..................................... 463/8 |
| 5,963,891 A | 10/1999 | Walker et al. | |
| 7,760,248 B2 * | 7/2010 | Marks et al. .............. 348/231.4 |
| 7,791,808 B2 * | 9/2010 | French et al. ................ 359/630 |
| 2002/0145563 A1 * | 10/2002 | Kane et al. .................... 342/442 |
| 2010/0184513 A1 | 7/2010 | Mukasa et al. | |

FOREIGN PATENT DOCUMENTS

| | | |
|---|---|---|
| CN | 1904806 A | 1/2007 |
| CN | 101479782 A | 7/2009 |
| CN | 101577062 A | 11/2009 |
| JP | H1040418 A | 2/1998 |
| JP | H10261090 A | 9/1998 |
| JP | 2001504605 A | 4/2001 |
| JP | 2002153673 A | 5/2002 |
| WO | WO-2009031645 A1 | 3/2009 |

OTHER PUBLICATIONS

International Search Report and Written Opinion—PCT/US2011/041124—ISA/EPO—Nov. 2, 2011.

* cited by examiner

*Primary Examiner* — Paul A D'Agostino
*Assistant Examiner* — Brandon Gray
(74) *Attorney, Agent, or Firm* — Dang M. Vo; Satheesh K. Karra

(57) ABSTRACT

An apparatus for data processing, according to one or more aspects of the disclosure, includes a processing system configured to communicate with at least one of a plurality of reference nodes worn on body parts to obtain body positioning data relating to relative position between the body parts, and provide body tracking based on the body positioning data. The body positioning data relates to ranging and/or angular position between each of the reference nodes and a reference plane defined by one or more of the reference nodes.

49 Claims, 11 Drawing Sheets

*Reference Plane Node Maps*

METHOD AND APPARATUS FOR TRACKING ORIENTATION OF A USER

CROSS-REFERENCE TO RELATED APPLICATION(S)

This application claims priority to and the benefit of U.S. Provisional Application Ser. No. 61/430,007, entitled "Method and Apparatus for Tracking Orientation of a User" and filed on Jan. 5, 2011, the contents of which are hereby incorporated by reference herein in their entirety.

BACKGROUND

I. Field

The following description relates generally to computer science, and more particularly to a method and an apparatus for tracking orientation of a user.

II. Background

Some conventional body tracking techniques are deficient with respect to accuracy, interference, and set-up. These conventional body tracking techniques require controlled and fixed environments, multiple sensors on-and-off the body, and cameras. Strictly controlling the environment and needing a fixed location with a system of motion capture sensors or cameras surrounding the body being tracked significantly restricts a trackable area. These conventional body tracking techniques generally need a large number of cameras, motion capture sensors, or magnets surrounding the body to generate a 3-Dimensional environment for user orientation in space. These conventional body tracking techniques can be costly to implement and are difficult to implement properly, which leaves non-professional companies or individuals without an option to utilize body tracking technology. Therefore, there exists a need to improve body tracking techniques.

SUMMARY

The following presents a simplified summary of one or more aspects of methods and apparatuses to provide a basic understanding of such methods and apparatuses. This summary is not an extensive overview of all contemplated aspects of such methods and apparatuses, and is intended to neither identify key or critical elements of all aspects nor delineate the scope of any or all methods or apparatuses. Its sole purpose is to some concepts of one or more aspects in a simplified form as a prelude to the more detailed description that is presented herein.

According to one aspect of the disclosure, an apparatus for tracking orientation of a user includes a processing system configured to communicate with at least one of a plurality of reference nodes worn on body parts to obtain body positioning data relating to relative position between the body parts, and provide body tracking based on the body positioning data. The body positioning data relates to ranging and/or angular position between each of the reference nodes and a reference plane defined by one or more of the reference nodes.

According to one aspect of the disclosure, a method for data processing includes communicating with at least one of a plurality of reference nodes worn on body parts to obtain body positioning data relating to relative position between the body parts and providing body tracking based on the body positioning data. The body positioning data relates to ranging and/or angular position between each of the reference nodes and a reference plane defined by one or more of the reference nodes.

According to one aspect of the disclosure, an apparatus for data processing includes means for communicating with at least one of a plurality of reference nodes worn on body parts to obtain body positioning data relating to relative position between the body parts and means for providing body tracking based on the body positioning data. The body positioning data relates to ranging and/or angular position between each of the reference nodes and a reference plane defined by one or more of the reference nodes.

According to one aspect of the disclosure, a computer program product includes a computer-readable medium comprising codes executable to cause an apparatus to communicate with at least one of a plurality of reference nodes worn on body parts to obtain body positioning data relating to relative position between the body parts and provide body tracking based on the body positioning data. The body positioning data relates to ranging and/or angular position between each of the reference nodes and a reference plane defined by one or more of the reference nodes.

According to one aspect of the disclosure, a game console for data processing includes a receiver configured to receive information from a user and a processing system configured to communicate with at least one of a plurality of reference nodes worn on body parts of the user to obtain body positioning data relating to relative position between the body parts of the user, and provide body tracking of the user based on the body positioning data. The body positioning data relates to ranging and/or angular position between each of the reference nodes and a reference plane defined by one or more of the reference nodes.

To the accomplishment of the foregoing and related ends, the one or more aspects of the various methods and apparatuses presented throughout this disclosure comprise the features hereinafter fully described and particularly pointed out in the claims. The following description and the annexed drawings set forth in detail provide certain illustrative aspects of the various methods and apparatuses. These aspects are indicative, however, of but a few of the various ways in which the principles of such methods and apparatuses may be employed and the described aspects are intended to include all variations of such methods and apparatuses and their equivalents.

DETAILED DESCRIPTION

Various aspects of methods and apparatuses will be described more fully hereinafter with reference to the accompanying drawings. These methods and apparatuses may, however, be embodied in many different forms and should not be construed as limited to any specific structure or function presented in this disclosure. Rather, these aspects are provided so that this disclosure will be thorough and complete, and will fully convey the scope of these methods and apparatus to those skilled in the art. Based on the teachings herein, one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the aspects presented throughout this disclosure herein. It should be understood that any aspect of the disclosure herein may be embodied by one or more elements of a claim.

Figure 1A:
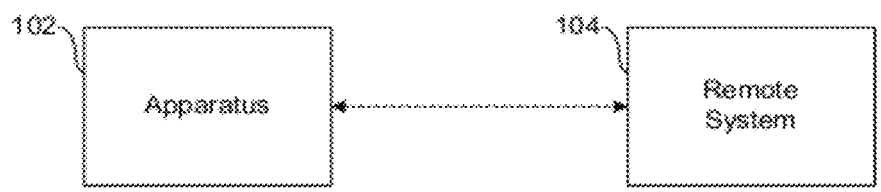
FIG. 1A shows an example of an apparatus and a separate remote system, in accordance with aspects of the disclosure.

Several aspects of this disclosure will now be presented with reference to FIG. 1A. FIG. 1A is a conceptual diagram illustrating an example of an apparatus 102 and a remote system 104 that may be separate from the apparatus 102. The apparatus 102 may comprise any node capable of tracking orientation of a user, including by way of example, a computer including a game console. In this aspect, user gestures and/or movements may be utilized to control interactions with applications (e.g., graphical user interface applications including video games) provided by the apparatus 102 to make the user's experience more interactive, and user gestures and/or movements may be scaled according to at least one physical dimension of the user to improve the user's experience. Alternatively, the apparatus 102 may utilize any other node that can remotely track user gestures, movements, and/or orientation, such as, a computer with gesture, movement, and/or orientation recognition capability to reduce or eliminate the need for traditional keyboard and mouse setup, a robotic system capable of gesture, movement, and/or orientation recognition, personal computing device (e.g., laptop, personal computer (PC), personal digital assistant (PDA)), a personal communication device (e.g., mobile phone), an entertainment device (e.g., game console, digital media player, television), sign language recognition systems, facial gesture, movement, and/or orientation recognition systems, or any other suitable node responsive to input methods other than traditional touch, pointing device, and speech.

User gestures may originate from any user body motion, movement, pose, and/or change in orientation. User gestures may include full body motion, movement, pose, and/or change in orientation, and user gestures may include any body part motion, movement, pose, and/or change in orientation. For example, user gestures may include hand movements (e.g., punch, chop, lift, etc.), foot movements (e.g., kick, knee bend, etc.), head movements (e.g., head shake, nod, etc.), and/or body movements (e.g., jumping, kneeling, lying down, etc.).

The remote system 104 may be any suitable system capable of communicating with the apparatus 102 to support tracking orientation of a user including user gesture, motion, and/or movement recognition functionality. In at least one aspect, the remote system 104 may be configured to provide at least one input for gesture scaling by the apparatus 102 to improve the gesture accuracy of the user during the operation of the apparatus 102. By way of example, the gesture input required by a user to trigger an action or enter a command may be scaled based on at least one physical dimension and/or at least one movement of the user with the remote system 104.

Referring to FIG. 1A, the apparatus 102 is shown with a wireless connection to the remote system 104. However, in other aspects, the apparatus 102 may have a wired connection to the remote system 104. In the case of a wireless connection, any suitable radio technology or wireless protocol may be used. By way of example, the apparatus 102 and the remote system 104 may be configured to support wireless communications using Ultra-Wideband (UWB) technology including Qualcomm Personal Area Network Low power technology (PeANUT), 802.11n, etc. UWB technology utilizes high speed short range communications and may be defined as any radio technology having a spectrum that occupies a bandwidth greater than 20 percent of the center frequency, or a bandwidth of at least 500 MHz. Alternatively, the apparatus 102 and remote system 104 may be configured to support Bluetooth, Two-Way Infrared Protocol (TWIRP), or some other suitable wireless protocol.

In another case of a wireless connection, another suitable radio technology or wireless protocol that may be used may include a peer-to-peer network. In one example, peer-to-peer networks may utilize mesh-based access technologies including UWB, PeANUT, 802.11n, etc. A mesh-based network may utilize orthogonal frequency division multiplexing (OFDM) for the physical layer. The peer-to-peer network may be a short range, low power, and high bandwidth network.

In one implementation of the remote system 104, one or more sensors may be utilized and configured to provide one or more signals to the apparatus 102. Generally, a sensor is a device configured to measure or capture a physical quantity (e.g., motion, movement, acceleration, orientation, distance, range, height, length, etc.) and convert the physical quantity into a signal that can be transmitted to and processed by the apparatus 102. The one or more sensors may comprise one or more remote accelerometers, remote ranging sensors, remote gyros, or any other suitable sensor, or any combination thereof.

In another implementation of the remote system 104, a belt or harness may be utilized. The belt or harness may be wearable by a user. The belt or harness may include one or more sensors for tracking gestures, motion, movement, and/or changes in orientation of the user with or without regard to the location of the user relative to the apparatus 102. The belt or harness may include one or more sensors for measuring or capturing a physical dimension of the user to determine gestures, motion, movement, and/or changes in orientation of the user with or without regard to the location of the user relative to the apparatus 102. The one or more sensors may comprise one or more remote accelerometers, remote ranging sensors, remote gyros, or any other suitable sensor, or any combination thereof. The apparatus 102 may comprise means for supporting the apparatus 102 on a body so that the apparatus 102 is wearable by a user and may be worn on the body of a user. The means for supporting the apparatus 102 on the body of a user may include some type of fastener, clip, snap, button, adhesive, etc., and/or the apparatus 102 may be supported by and/or attached to clothing, a belt, or a harness. Accordingly, in one example, the apparatus 102 may be configured to communicate with the sensors of the belt or harness (remote system 104) to measure, capture, and/or track physical dimensions, gestures, motion, movement, and/or changes in orientation of the user.

In another implementation of the remote system 104, a mat or platform may be utilized. The mat or platform may be positioned on the ground to establish ground level relative to a user. The mat or platform may include one or more sensors for tracking gestures, motion, movement, and/or changes in orientation of the user with or without regard to the location of the user relative to the apparatus 102. The mat or platform may include one or more sensors for measuring or capturing a physical dimension of the user to determine gestures, motion, movement, and/or changes in orientation of the user with or without regard to the location of the user relative to the apparatus 102. The one or more sensors may comprise one or more remote accelerometers, remote ranging sensors, remote gyros, or any other suitable sensor, or any combination thereof. As previously described, the apparatus 102 may comprise means for supporting the apparatus 102 on the body of a user, and in this instance, the apparatus 102 may be configured to communicate with the sensors of the mat or platform (remote system 104) to measure, capture, and/or track physical dimensions, gestures, motion, movement, and/or changes in orientation of the user. As previously described, the apparatus 102 may include means for supporting the apparatus 102 on the body of a user, such as some type of fastener, clip, snap, button, adhesive, etc., and/or the apparatus 102 may be supported by and/or attached to clothing, a belt, or harness.

Figure 1B:
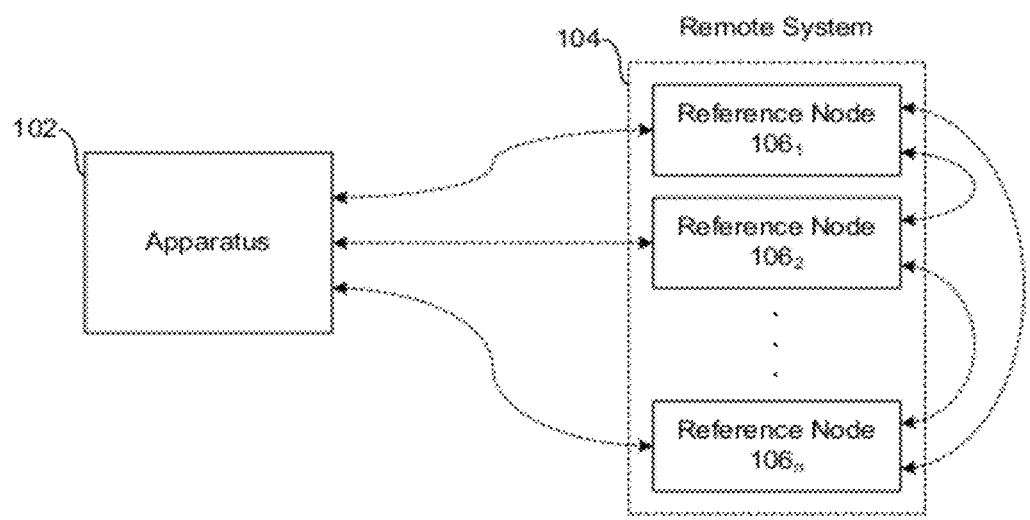
FIG. 1B shows an example of the apparatus and the separate remote system including one or more reference nodes, in accordance with aspects of the disclosure.

Referring to FIG. 1B, a conceptual diagram illustrates an example of the apparatus 102 and the remote system 104 comprising, in one implementation, a system of one or more reference nodes $106_1$, $106_2$, ..., $106n$, where n refers to any integer. Each reference node $106_1$, $106_2$, ..., $106n$ may be any suitable node capable of communicating with the apparatus 102 to support tracking orientation of a user including user dimension, gesture, motion, and/or movement recognition functionality. Each reference node $106_1$, $106_2$, ..., $106n$ is configured to communicate with each other node $106_1$, $106_2$, ..., $106n$ and the apparatus 102 to support tracking orientation of a user including user dimension, gesture, motion, and/or movement recognition functionality. In at least one implementation of the system 104, each reference node $106_1$, $106_2$, ..., $106n$ may be configured to provide at least one input for gesture scaling by the apparatus 102 to improve the gesture accuracy of the user during the operation of the apparatus 102. The apparatus 102 is shown with a wireless connection to each reference node $106_1$, $106_2$, ..., $106n$. However, in other implementations, the apparatus 102 may have a wired connection to one or more reference nodes $106_1$, $106_2$, ..., $106n$.

In one implementation of the system 104, each reference node $106_1$, $106_2$, ..., $106n$ comprises at least one remote sensor configured to provide at least one signal to the apparatus 102. The signal may include sensing data, sensing parameter data, raw data, reference data, and/or any other relevant data. The signal may include at least a portion of body positioning data, physical dimensions data, body movement data, body tracking data, and/or various other relevant data. Each remote sensor is configured to measure or capture a physical quantity (e.g., physical dimension, motion, movement, acceleration, orientation, distance, range, height, length, etc.) and convert the physical quantity into at least one signal that can be transmitted to and processed by the apparatus 102. Each remote sensor comprises at least one of a remote accelerometer, a remote ranging sensor, and a remote gyro.

Figure 1C:
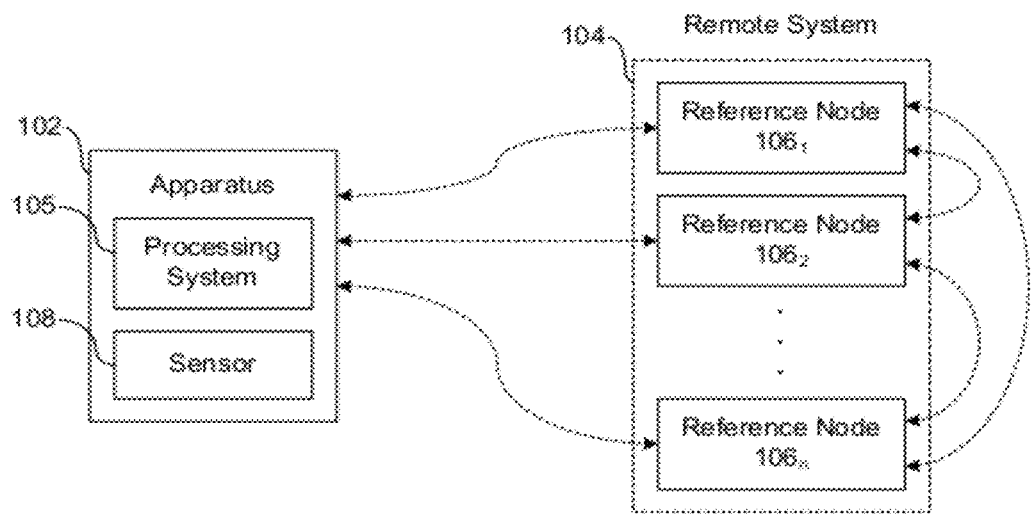
FIGS. 1C-1D show examples of the apparatus with a processing system and the separate remote system with reference nodes, in accordance with aspects of the disclosure.

Referring to FIG. 1C, a conceptual diagram illustrates an example of the apparatus 102 and the remote system 104 comprising the one or more reference nodes $106_1$, $106_2$, ..., $106n$. The apparatus 102 comprises a processing system 105 configured to communicate with each of the reference nodes $106_1$, $106_2$, ..., $106n$ that may be worn on body parts of a user to obtain body positioning data relating to relative position between the body parts of the user and provide body tracking based on the body positioning data. The body positioning data may relate to ranging and/or angular position between each of the reference nodes $106_1$, $106_2$, ..., $106n$ and a reference plane defined by one or more of the reference nodes $106_1$, $106_2$, ..., $106n$, which is described herein. The body positioning data may include data related to one or more physical dimensions of the body of a user and/or data related to one or more movements of the body of the user. The body positioning data may include data related to a relationship between one or more physical dimensions of the body of the user and one or more movements of the body of the user.

In one aspect of the disclosure, the apparatus 102 may comprise a game console, and the processing system 105 may be configured to support one or more gaming applications executable by the game console. As such, the apparatus 102 comprises means for supporting one or more gaming applications. As previously described, the apparatus 102 may comprise means for supporting the apparatus 102 on the body of a user. The apparatus 102 may comprise at least one sensor 108 configured to generate reference data (i.e., sensing parameters) relating to relative position of at least one body part in a manner as previously described in reference to the reference nodes $106_1$, $106_2$, ..., $106n$. The apparatus 102 communicates with the sensor 108 and/or each reference node $106_1$, $106_2$, ..., $106n$ to receive data and information including sensing signals and/or sensing parameters that may include sensing data, sensing parameter data, raw data, reference data, and/or any other type of relevant data. The data, sensing signals, and/or sensing parameters may include a portion of body positioning data, physical dimensions data, body movement data, body tracking data, and/or various other relevant data. In an example, the sensor 108 comprises a sensing means for generating reference data relating to relative position of at least one body part.

The processing system 105 may obtain body positioning data by computing raw data received from the sensor 108 and/or each reference node $106_1$, $106_2$, ..., $106n$. The processing system 105 may obtain body positioning data by receiving at least a portion of body positing data from one or more of the reference node $106_1$, $106_2$, ..., $106n$. The processing system 105 may obtain body positioning data by generating at least a portion of the body positing data. The body positioning data may include one or more physical dimensions of the body, one or more movements of the body, and/or a relationship between the one or more physical dimensions of the body and the one or more movements of the body to provide body tracking based on the body positioning data.

The processing system 105 may be configured to determine range and/or angular position between reference nodes $106_1, 106_2, \ldots, 106n$ with various RF techniques including monitoring signal strength, monitoring signal attenuation, time of flight of a single signal with timing synchronization, round-trip delay, magnetic field sensing, etc. For example, the processing system 105 may be configured to determine range and/or angular position between reference nodes $106_1, 106_2, \ldots, 106n$ by a round-trip delay of a multiple signals sent to each node $106_1, 106_2, \ldots, 106n$ and/or round-trip delay of a single signal sent through multiple reference nodes $106_1, 106_2, \ldots, 106n$. The body positioning data may include data and information related to ranging and/or angular position between the apparatus 102 and each of the reference nodes $106_1, 106_2, \ldots, 106n$ to provide body tracking based on the body positioning data. The body positioning data may include data and information related to ranging and/or angular position between each of the reference nodes $106_1, 106_2, \ldots, 106n$ and a reference plane defined by one or more of the reference nodes $106_1, 106_2, \ldots, 106n$ to provide body tracking based on the body positioning data.

Figure 1D:
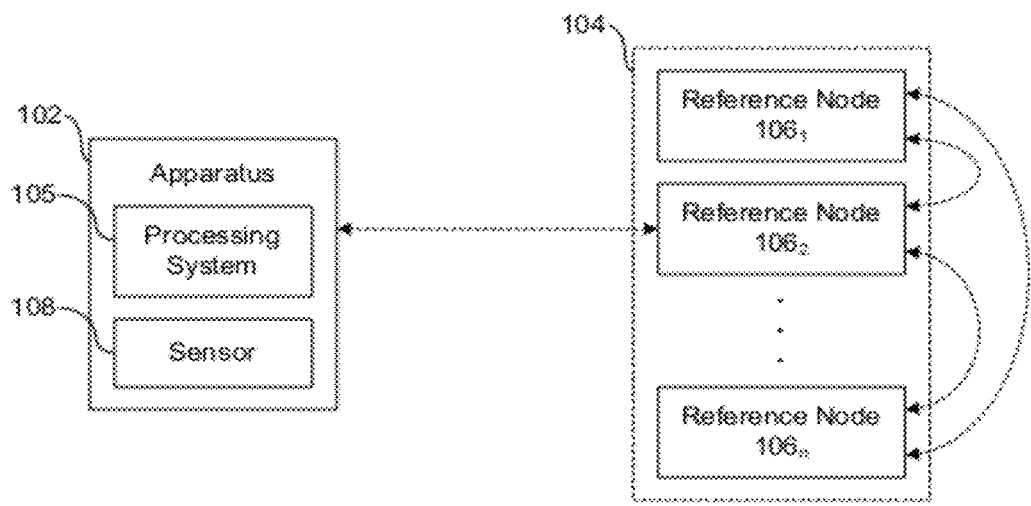

Referring to FIG. 1D, a conceptual diagram illustrates an example of the apparatus 102 and the remote system 104 comprising the one or more reference nodes $106_1, 106_2, \ldots, 106n$. The apparatus 102 comprises the processing system 105 configured to communicate with at least one of the reference nodes $106_1, 106_2, \ldots, 106n$ to obtain body positioning data relating to the relative position of the other reference nodes $106_1, 106_2, \ldots, 106n$ between the body parts of the user and provide body tracking based on the body positioning data. As described herein, the one or more reference nodes $106_1, 106_2, \ldots, 106n$ may be worn on body parts of the user. The body positioning data may relate to ranging and/or angular position between each of the reference nodes $106_1, 106_2, \ldots, 106n$ and a reference plane defined by one or more of the reference nodes $106_1, 106_2, \ldots, 106n$, which is described herein. In an example, as shown in FIG. 1D, the reference nodes $106_1, 106_2, \ldots, 106n$ are configured to communicate with each other to transfer body positioning data therebetween, and at least one of the reference nodes, such as reference node $106_2$, is configured to communicate with the processing system 105 so that the processing system 105 obtains the body positioning data relating to relative position between the body parts of the user.

In one aspect of the disclosure, the reference nodes $106_1, 106_2, \ldots, 106n$ may be configured to communicate with each other with one type of communication technology, and the processing system 105 may be configured to communicate with one or more of the reference nodes $106_1, 106_2, \ldots, 106n$ with the same communication technology or another different communication technology.

In accordance with aspects of the disclosure, body tracking may be achieved with visual features, optical markers, mechanically, magnetically, and acoustically. In one example, a visual feature tracking utilizes cameras to capture and recognize visual gestures of a user. This technique utilizes a controlled space, controlled lighting conditions, and sometimes post-processing to track gross visual gestures for one or more bodies. In another example, optical marker tracking utilizes multiple cameras to capture a position of wearable markers, such as reflective or infrared markers. This technique utilizes a controlled space, controlled lighting conditions, and lengthy post-processing to track gross visual gestures for one or more bodies. The optical marker tracking is different than visual tracking in its ability to capture detailed data and fine gestures. In another example, mechanical tracking utilizes wearable inertial sensors to capture motion and may be worn by a user to track movement. This technique may not need controlled space or light, but frequent re-calibration may be needed. In another example, magnetic tracking utilizes receivers with multiple (e.g., 3) orthogonal coils to measure relative magnetic flux from orthogonal coils on transmitter, receiver, or transmitter static. This technique reduces line of sight problems and provides an orientation of the user in space. In another example, acoustic tracking utilizes a system of wearable receivers to track signals to and from wearable beacons. This technique utilizes at least one off-body beacon to avoid root drift, temperature and humidity calibration, and supports tracking multiple bodies with different frequencies.

In accordance with an aspect of the disclosure, the body tracking apparatus 102 that may be worn is provided and is configured to interface with one or more transmitting and receiving sensors (i.e., reference nodes $106_1, 106_2, \ldots, 106n$) worn on a body of a user. The apparatus 102 is configured to track body orientation in space without using an off-body beacon. The user may wear multiple sensors (i.e., reference nodes $106_1, 106_2, \ldots, 106n$) around a portion of the body (e.g., waist) to form a reference plane in which other worn sensors (i.e., reference nodes $106_1, 106_2, \ldots, 106n$) can have their orientation in reference to the reference plane tracked. The multiple sensors (i.e., reference nodes $106_1, 106_2, \ldots, 106n$) may be configured to form the reference plane and are able to track orientation of any other proximate sensor using an equation, e.g., as provided in FIG. 3H.

In accordance with an aspect of the disclosure, the reference plane may be defined on a portion of the user's body (e.g., around the user's waist), and the reference plane may be utilized as an initial orientation input for body tracking. Placing other sensors on different parts of the body may allow 3-dimensional movement tracking in reference to the defined reference plane. For example, tracking orientation of multiple sensors as a reference plane may be utilized to define an additional remote sensor to a particular body part (e.g., left hand). The apparatus 102 may include a learning module to match the movement being input to body movements in a database or past stored personal data. The apparatus 102 may include a user interface for prompting the user to enter physical body measurements before tracking body positioning. Defined sensors as reference nodes may be utilized to track key body parts, such as head, shoulders, hands, feet, elbows, knees, etc., and defined sensors as reference nodes may provide accurate orientation data in reference to the reference plane sensors worn, e.g., at the user's waist. In one example, defined sensors at a user's feet may provide a ground reference. In another example, defined sensors worn at the user's waist may be arranged to provide useful orientation information for a front, back, left, and/or right side of the user's waist. The apparatus 102 may be configured to reduce reading errors and compensate for a lower than optimal number of readings. The apparatus 102 may utilize a user interface configured to prompt the user to enter body measurements, such as height, arm length, and/or arm span may provide physical dimension data for the apparatus 102 to use when tracking orientation and may reduce tracking errors.

In accordance with an aspect of the disclosure, the apparatus 102 may be configured to interface with multiple positioning sensors worn on a body, such as a user's waist, to generate a mobile 3-Dimensional body tracking frame of reference. The apparatus 102, as provided herein, is configured to track orientation of a body without the user of an off-body beacon or a controlled environment which requires many off-body beacons, sensors, or cameras. In one example, the apparatus 102 may be configured to interface with many sensors for detailed body tracking. The apparatus 102 may be configured to utilize one or more defined sensors to track one or more body parts and/or obtain body measurement data from the user to scale orientation information to track movement.

In accordance with an aspect of the disclosure, the apparatus 102 may be configured to utilize multiple transmitting and receiving sensors worn at the waist of a user to create a 3-Dimensional frame of reference and orientation information to track other worn sensors as nodes for other body parts and distances to be related to. The apparatus 102 may be configured to define remote sensors to particular body parts and sides of the body to provide orientation data other than the sensors worn at the waist to further enhance body tracking in reference to orientation in space. The apparatus 102 may be configured to utilize a learning module to track and/or match movement being input to body movements in a database or past stored personal data to enhance body tracking, which may reduce error and assist with an insufficient number of readings to estimate missed movements. The apparatus 102 may be configured to obtain body measurement data from user input to enhance body tracking and/or scaling of body tracking data, which may reduce errors and assist with an insufficient number of readings to estimate missed movements.

In accordance with an aspect of the disclosure, the apparatus 102 may be configured to scale user gestures and/or movements according to at least one physical dimension of the user to improve the user's experience. For example, scaling refers to a linear transformation that alters (i.e., increases or decreases) the reference size of an object or objects by a scale factor that may be similar in all directions. For example, two objects of the same height may be positioned at different distances from a reference point. From the view of the reference point, the object positioned at a greater distance from the reference point may appear smaller, even though the objects are of the same height. Thus, knowing the distance of each object from the reference point and each object's height provides a way to scale the objects in a uniform manner to be judged as the same height without regard of each objects position with respect to the reference point.

The apparatus 102 may be used for scaling gesture recognition to physical dimensions of a user. As described herein, the apparatus 102 is configured to obtain at least one physical dimension of a user and determine a gesture of the user based on the at least one physical dimension without regard to the location of the user relative to the apparatus 102. For example, in one implementation of the apparatus 102, a user may provide gesture input for triggering an action or entering a command may be scaled significantly different for users that vary in physical dimensions, such as height, arm span, etc. For instance, two different users, such as an adult and a child, may attempt to enter a similar command using a gesture input and the necessary movement may be too large for the child or too small for the adult. Therefore, gesture scaling may improve accuracy of user gesture input. The apparatus 102 may achieve gesture scaling by obtaining or determining at least one physical dimension of the user. The at least one physical dimension of the user may include height of the user, arm span of the user, height of a handheld device held at a neutral position, such as arms at the user's side. In some instances, accuracy of a scaling may vary depending on which physical dimension is selected or how calculated if not directly inputted by the user.

In one implementation of the apparatus 102, a physical dimension of a user may be determined by direct user input via a user interface device, such as a handheld device. For example, prompting the user to enter height or length of arm span may provide an accurate representation of scaling necessary for accurate interpretation of gesture input by the user.

In another implementation of the apparatus 102, a physical dimension of a user may be determined by utilizing a system 104 of sensors and prompting user movement. For example, the user may be prompted to touch a body part, such as the user's head, and then touch a baseline reference point, such as the ground, with a handheld device having a mechanical sensing device, such as an accelerometer, gyro, etc. The system 104 of sensors may be configured to identify and record starts and/or stops in movement followed by large movements to be a distance from head to ground. This learning technique may provide an approximation of height as different users may move the device from head to the ground in different manners. Some users may move the handheld device a shortest possible distance, and some users may move the handheld device a longer distance from head to ground.

In another implementation of the apparatus 102, a physical dimension of a user may be determined by utilizing a system 104 of ranging sensors with known physical dimensions, such as height, paired with prompted user movement. For example, if a user stands on a sensing mat having one or more ranging sensors with known height of zero and the user is then prompted to touch their head with a handheld device having a ranging sensor, the height of the user may be calculated in an accurate manner. Height and other physical dimensions may be calculated accurately when the system 104 of multiple ranging sensors (e.g., two or more ranging sensors) is utilized in combination with prompted movement with a handheld device. Alternatively, the system 104 of multiple ranging sensors may include two or more ranging sensors, and/or the system 104 of multiple ranging sensors may or may not be worn or held by the user.

In one implementation of the apparatus 102, user gestures may be obtained and/or determined based on at least one physical dimension of the user and an identified movement, wherein determining a gesture includes calibration of scale based on a relationship between the at least one physical dimension and the at least one movement of the user. This relationship may be defined in a lookup table or calculated by an equation. The apparatus 102 may be configured to improve accuracy of gesture scaling through a learning algorithm that accesses a history of movements performed by the user and adjusts an initial scaling that may be based on the at least one physical dimension. Information related to user physical dimensions, user movements, scaling, calibration of scale, any and all relationships between user physical dimensions and user movements, and history of user physical dimensions and user movements may be stored as part of a computer readable medium.

In another implementation of the apparatus 102, gesture recognition may be scaled to one or more physical dimensions of a user by selectively adjusting movements for particular inputs and/or commands to any physical dimension of the user. Properly adjusted movement parameters may provide an improved gesture input experience for users, may add an element of fairness to gaming applications, may reduce a risk of body strain when stretching farther than a natural range of movement for a user (e.g., forced adaptation of undersized users to large scale reference points), and may reduce the amount of attention necessary for satisfying user parameters when movement is confined to an unnaturally narrow range (e.g., forced adaptation of undersized users to large scale reference points). Information related to user movement parameters along with user physical dimensions, user movements, scaling, calibration of scale, any and all relationships between user physical dimensions and user movements, and history of user physical dimensions and user movements may be stored as part of a computer readable medium.

It should be appreciated that the teachings provided herein may be incorporated into (e.g., implemented within or performed by) various apparatuses (e.g., devices). For example, aspects of the disclosure may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a processor, a point-of-sale device, an audio/video device, a gaming console, a hearing aid, a set-top box, or any other suitable device. In particular, the teachings provided herein may be incorporated into various gaming apparatuses, consoles, devices, etc., such as Wii™, PlayStation™ or Xbox 360™, or other gaming platforms. The teachings provided herein may be incorporated into remote controls for gaming consoles, such as gaming controllers used with Wii™, PlayStation™ or Xbox 360™, or other gaming platforms, as well as gaming controllers used with personal computers, including tablets, computing pads, laptops, or desktops. Accordingly, any of the apparatuses, devices, and/or systems described herein may be implemented using some or all parts of the components described in FIGS. 1A and/or 1B.

In an aspect of the disclosure, the apparatus 102 provides the processing system 105 as a means for communicating with the remote system 104 including one or more reference nodes $106_1, 106_2, \ldots, 106n$ that may be worn on body parts to obtain body positioning data relating to relative position between the body parts. The processing system 105 may provide a means for receiving at least a portion of the body positioning data from one or more of the reference nodes $106_1, 106_2, \ldots, 106n$. The processing system 105 may provide a means for communicating with the reference nodes $106_1, 106_2, \ldots, 106n$ when worn on body parts of multiple users to obtain the body positioning data. Further, the apparatus 102 provides the processing system 105 as a means for providing body tracking based on the body positioning data, which may relate to ranging and/or angular position between each of the reference nodes $106_1, 106_2, \ldots, 106n$ and a reference plane defined by one or more of the reference nodes. The processing system 105 may provide a means for generating at least a portion of the body positioning data. The apparatus 102 may provide a sensing means for generating reference data relating to relative position of at least one body part, wherein the sensing means comprises a sensor, such as sensor 108 in FIG. 1C.

Figure 2A:
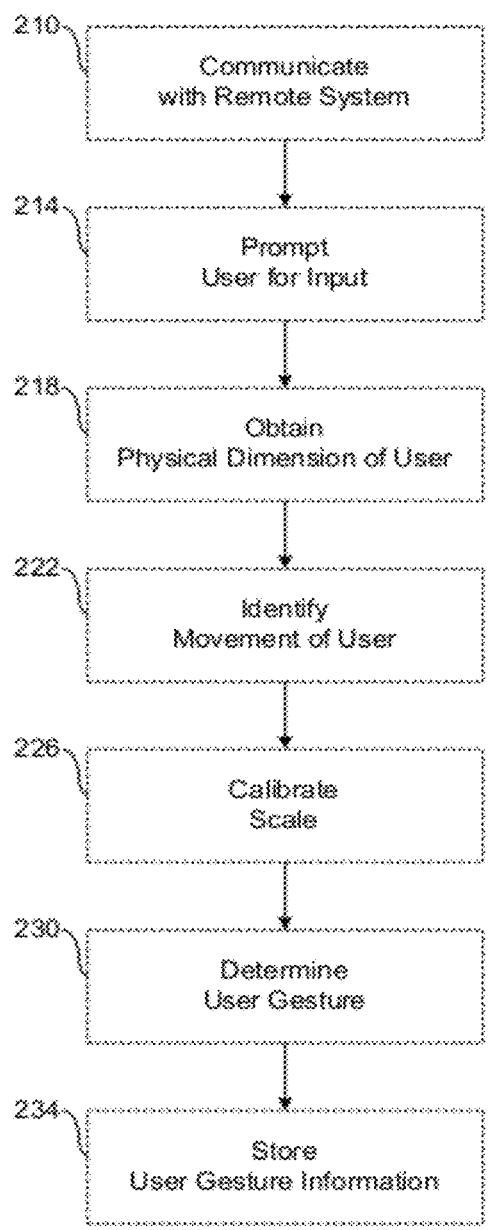
FIG. 2A shows an example of a process for scaling gesture recognition, in accordance with aspects of the disclosure.

FIG. 2A shows an example of a process for scaling gesture recognition, in accordance with an aspect of the disclosure. In block 210, the apparatus 102 may communicate with the remote system 104 (block 210). In block 214, the apparatus 102 may prompt the user for input. Alternatively, the apparatus 102 may be configured to communicate with one or more of the reference nodes $106_1, 106_2, \ldots, 106n$ and prompt the user for input. User input may be in the form of direct user input into the apparatus 102 or via a remote handheld device, and/or user input may be in the form of a learned behavior, as described herein.

In block 218, the apparatus 102 may obtain or determine at least one physical dimension of the user. The at least one physical dimension may comprise at least one of height of the user, length of arm span of the user, and distance of the user from the apparatus 102. The apparatus 102 may be configured to obtain at least one physical dimension of the user by receiving the at least one physical dimension as an input by the user. The apparatus 102 may be configured to obtain at least one physical dimension of the user by learning the at least one physical dimension of the user from a sensor map having at least one sensor positioned proximate to the ground and a device held by the user at a physical height of the user. The apparatus 102 may be configured to obtain at least one physical dimension of the user by learning the at least one physical dimension of the user from a handheld device moved between a first position proximate to the ground and a second position proximate to at a physical height of the user. The apparatus 102 may be configured to obtain at least one physical dimension of the user by prompting the user to lift at least one arm until parallel to the ground to measure arm span of the user.

In block 222, the apparatus 102 may identify at least one movement of the user. The apparatus 102 may be configured to identify the at least one movement of the user by capturing the at least one movement from at least one of a remote accelerometer, a remote ranging sensor, or a remote gyro.

In block 226, the apparatus 102 may calibrate scale for the user. The apparatus 102 may be configured to calibrate scale for the user based on a relationship between the at least one physical dimension and the at least one movement of the user.

In block 230, the apparatus 102 may determine a gesture of the user. The apparatus 102 may be configured to determine the gesture of the user based on the at least one physical dimension without regard to a location of the user relative to the apparatus 102. The apparatus 102 may be configured to identify at least one movement of the user, and determine the gesture of the user based also on the at least one identified movement. The apparatus 102 may be configured to determine the gesture as a calibration of scale based on a relationship between the at least one physical dimension and the at least one movement of the user.

The apparatus 102 may utilize a lookup table determine the relationship between the at least one physical dimension and the at least one movement of the user. The apparatus 102 may define the relationship by utilizing an equation.

In block 234, the apparatus 102 may be configured to optionally store information related to the determined gesture of the user. The apparatus 102 may be configured to store information related to the determined gesture of the user based on the at least one physical dimension without regard to a location of the user relative to the apparatus 102. The apparatus 102 may be configured to store information related to the identified movement of the user and store information related to the determined gesture of the user based also on the at least one identified movement. The apparatus 102 may be configured store information related to the determined gesture as a calibration of scale based on a relationship between the at least one physical dimension and the at least one movement of the user. Any information related to the determined gesture of the user may be stored or recorded in a computer readable medium. Obtaining, determining, identifying calibrating, scaling, storing, recording, and/or communicating information related to user gestures, user physical dimensions, and/or user movements may be utilized by the apparatus 102 to replay as an avatar of the user, without departing from the scope of the disclosure.

It will be understood that the specific order or hierarchy of steps in the processes disclosed is an illustration of exemplary approaches. Based upon design preferences, it is understood that the specific order or hierarchy of steps in the processes may be rearranged. The accompanying method claims elements of the various steps in a sample order, and are not meant to be limited to the specific order or hierarchy presented.

Figure 2B:
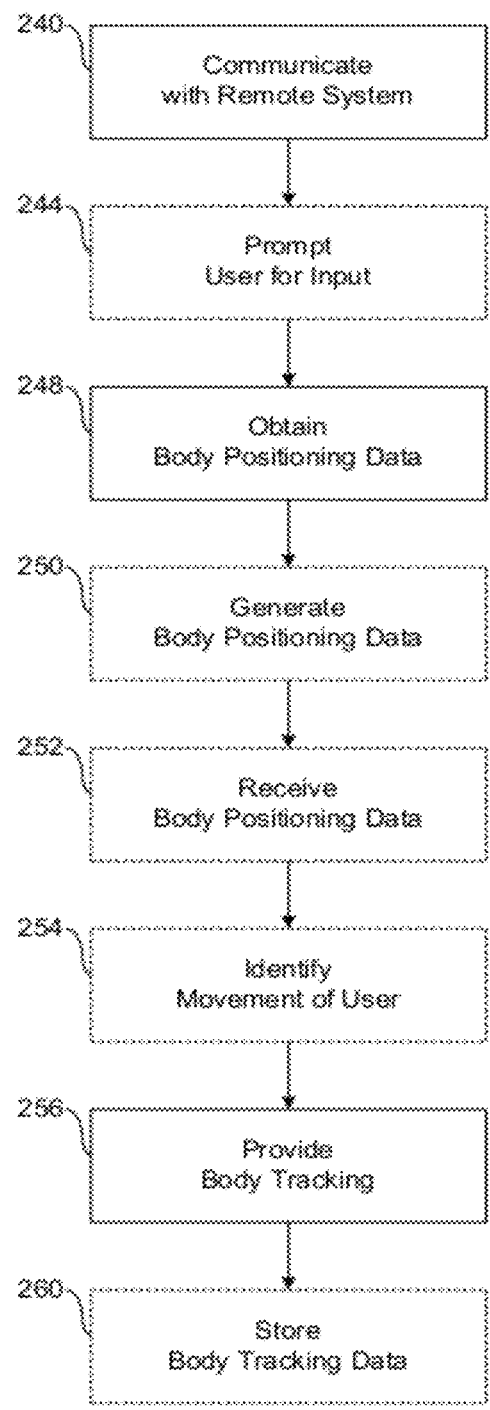
FIG. 2B shows an example of a process for tracking orientation, in accordance with aspects of the disclosure.

FIG. 2B shows an example of a process for tracking user orientation, in accordance with an aspect of the disclosure. In block 240, the apparatus 102 may communicate with the remote system 104 including one or more reference nodes $106_1, 106_2, \ldots, 106n$. In block 244, the apparatus 102 may optionally prompt the user for input. The apparatus 102 may be configured to communicate with the one or more of the reference nodes $106_1, 106_2, \ldots, 106n$ and prompt the user for input. User input may be in the form of direct user input via a user interface component (e.g., a handheld device), and/or user input may be in the form of a learned behavior, as described in greater detail herein.

In block 248, the apparatus 102 obtains or determines body positioning data relating to relative position between body parts. The apparatus 102 may be configured to be worn on the body with the remote system 104 including one or more reference nodes $106_1, 106_2, \ldots, 106n$. The apparatus 102 may be configured to communicate with the remote system 104 including one or more reference nodes $106_1, 106_2, \ldots, 106n$ to obtain the body positioning data. The remote system 104 may include a set of reference nodes $106_1, 106_2, \ldots, 106n$ worn on the body to define a reference plane, and the body positioning data includes the reference plane defined by the remote system 104. The remote system 104 may include one or more additional nodes $106_1, 106_2, \ldots, 106n$ worn on one or more body parts, and the body positioning data relates to a distance between each of the one or more additional nodes $106_1, 106_2, \ldots, 106n$ and the reference plane. The body positioning data may include one or more physical dimensions of the body.

In block 250, the apparatus 102 may be configured to generate at least a portion of the body positioning data. In an example, the apparatus 102 may obtain or determine body positioning data relating to relative position between body parts by generating at least a portion of the body positioning data.

In block 252, the apparatus 102 may be configured to receive at least a portion of the body positioning data from the remote system 104 including from one or more of the reference nodes $106_1, 106_2, \ldots, 106n$. In an example, the apparatus 102 may obtain or determine body positioning data relating to relative position between body parts by receiving at least a portion of the body positioning data from the remote system 104 including from one or more of the reference nodes $106_1, 106_2, \ldots, 106n$.

In block 254, the apparatus 102 may be configured to identify at least one movement of the user. The apparatus 102 may be configured for identifying at least one movement of the user by capturing the at least one movement from at least one of a remote accelerometer, a remote ranging sensor, or a remote gyro. The body positioning data may include one or more movements of the body. The positioning data may include a relationship between the one or more physical dimensions of the body and the one or more movements of a body. The body positioning data may include tracked body movements. The apparatus 102 may be configured to create an historical record of body movements from the body positioning data.

In block 256, the apparatus 102 provides body tracking based on the body positioning data. The apparatus 102 may utilize the equation of FIG. 3H to determine a relationship between a reference plane and a reference node as related to a body. The apparatus 102 may define the relationship by utilizing the equation of FIG. 3H to track movement of at least one body part in reference to the body as defined by the reference plane. In an aspect of the disclosure, providing body tracking may include creating a historical record of the one or more physical dimensions of the body and/or the one or more movements of the body from the body positioning data. In another aspect of the disclosure, providing body tracking related to the user may include creating a historical record of a relationship between one or more physical dimensions of the body and one or more movements of the body from the body positioning data.

In block 260, the apparatus 102 is configured to optionally store body tracking data related to a user. The apparatus 102 may be configured to store information related to the body tracking data relative to positioning data between body parts. The apparatus 102 may be configured to store data and information related to the identified movement of the user and store information related to body tracking of the user based also on the at least one identified movement. Any information related to body tracking data of the user may be stored or recorded in a computer readable medium. Obtaining, determining, identifying calibrating, scaling, storing, recording, and/or communicating information related to user body tracking data, user gestures, user physical dimensions, and/or user movements may be utilized by the apparatus 102 to replay as an avatar of the user, without departing from the scope of the disclosure. In an aspect of the disclosure, storing body tracking data related to the user may include creating a historical record of the one or more physical dimensions of the body and/or the one or more movements of the body from the body positioning data. In another aspect of the disclosure, storing body tracking data related to the user may include creating a historical record of a relationship between one or more physical dimensions of the body and one or more movements of the body from the body positioning data.

It will be understood that the specific order or hierarchy of steps in the processes disclosed is an illustration of exemplary approaches. Based upon design preferences, it is understood that the specific order or hierarchy of steps in the processes may be rearranged. The accompanying method claims elements of the various steps in a sample order, and are not meant to be limited to the specific order or hierarchy presented.

Figure 2C:
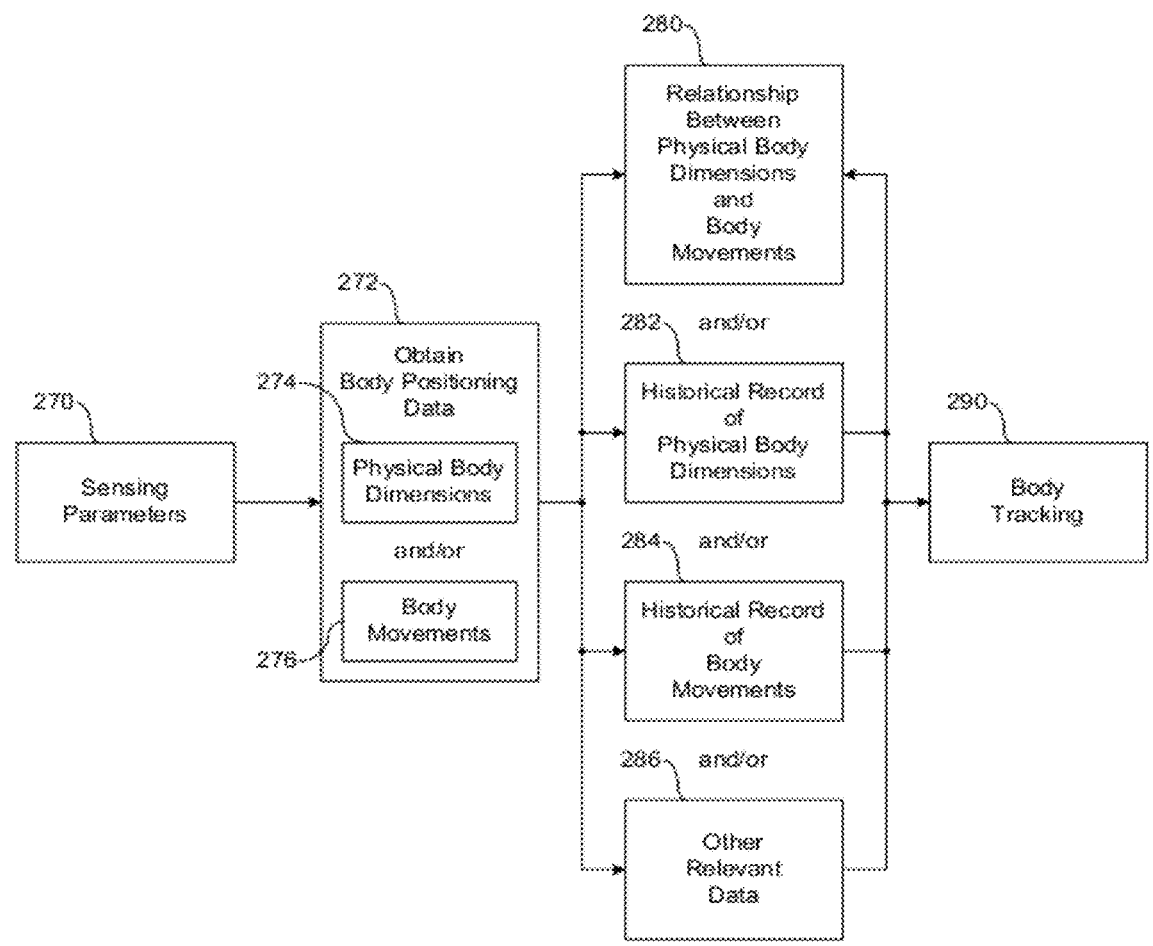
FIG. 2C shows an example of a flow diagram for processing data and/or information related to tracking user orientation, in accordance with aspects of the disclosure.

FIG. 2C shows an example of a flow diagram for processing data and/or information related to tracking user orientation, in accordance with an aspect of the disclosure. The apparatus 102 is configured to communicate with the remote system 104 including the reference nodes $106_1, 106_2, \ldots, 106n$ to receive sensing parameters 270 from the reference nodes $106_1, 106_2, \ldots, 106n$. In one implementation, the reference nodes $106_1, 106_2, \ldots, 106n$ are worn on body parts of a user so that the apparatus 102 may obtain body positioning data 272 relating to relative position between the body parts of the user and provide body tracking 290 based on the body positioning data 272. The body positioning data 272 relates to ranging and/or angular position between each of the reference nodes $106_1, 106_2, \ldots, 106n$ and a reference plane defined by one or more of the reference nodes $106_1, 106_2, \ldots, 106n$. The body positioning data 272 may include one or more physical dimensions of the body 274. The body positioning data 272 may include one or more movements of the body 276. The body positioning data 272 may include data related to a relationship between the one or more physical dimensions of the body and the one or more movements of the body 280. The body positioning data 272 may include a historical record of the one or more physical dimensions of the body 282. The body positioning data 272 may include a historical record of the one or more movements of the body 284. The body positioning data 272 may include other relevant data 286.

The apparatus 102 is configured to communicate with the sensor 108 and/or each reference node $106_1, 106_2, \ldots, 106n$ to receive data and information including sensing signals and/or sensing parameters that may include sensing data, sensing parameter data, raw data, reference data, and/or any other type of relevant data. The data, sensing signals, and/or sensing parameters may include a portion of body positioning data, physical dimensions data, body movement data, body tracking data, and/or various other relevant data.

The apparatus 102 may be configured to generate at least a portion of the body positioning data and/or receive at least a portion of the body positioning data from one or more of the reference nodes $106_1, 106_2, \ldots, 106n$. The apparatus 102 may comprise a game console, and the apparatus 102 may be configured to support one or more gaming applications. The apparatus 102 may include means for supporting the apparatus 102 on the body of a user, such as some type of fastener, clip, snap, button, adhesive, etc., and/or the apparatus 102 may be supported by and/or attached to clothing, a belt, or harness.

The apparatus 102 may be configured to communicate with the reference nodes $106_1, 106_2, \ldots, 106n$ when worn on body parts of multiple users to obtain the body positioning data. As such, the body positioning data may relate to ranging and/or angular position between each of the reference nodes $106_1, 106_2, \ldots, 106n$ worn on different users and/or a reference plane defined by one or more of the reference nodes $106_1, 106_2, \ldots, 106n$ worn on at least one of the users.

Figure 3A:
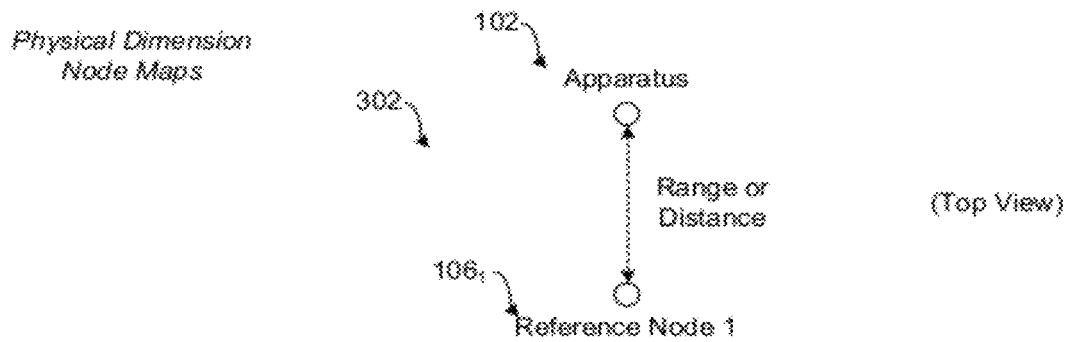
FIGS. 3A-3D show examples of node maps, in accordance with aspects of the disclosure.
Figure 3B:
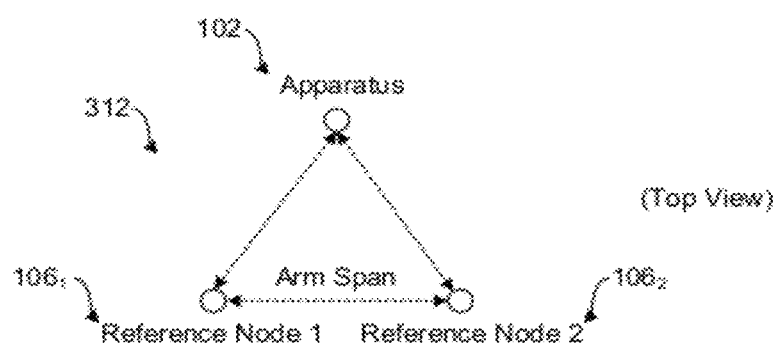
Figure 3C:
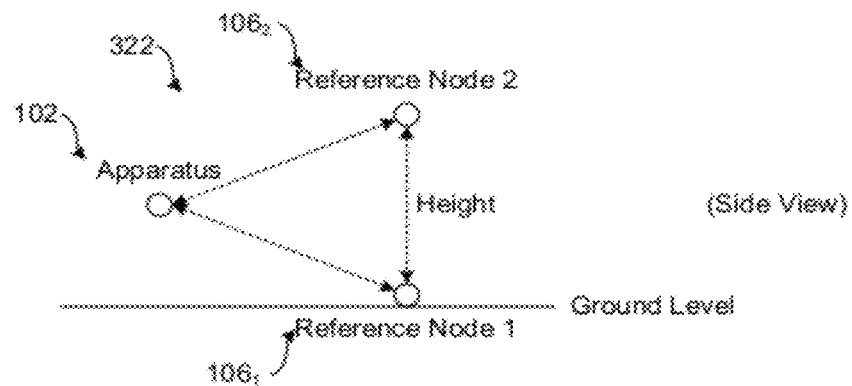

FIGS. 3A-3C are conceptual diagrams illustrating examples of the apparatus 102 and the remote system 104 being configured to determine at least one physical dimension of the user by utilizing one or more reference nodes $106_1, 106_2, \ldots, 106n$.

For example, referring to FIG. 3A, the apparatus 102 may determine at least one physical dimension of the user by learning the at least one physical dimension of the user from a node map 302 defining the range or distance between the apparatus 102 and at least one reference node $106_1$ positioned proximate to the user.

In another example, referring to FIG. 3B, the apparatus 102 may determine at least one physical dimension (e.g., length of arm span) of the user by learning the at least one physical dimension of the user from another node map 312 having at least one reference node $106_1$ positioned proximate to one hand of the user and at least one other reference node $106_2$ positioned proximate to the other hand of the user at a physical arm span of the user. The apparatus 102 may be configured to determine a range or distance between the apparatus 102 and each reference node $106_1, 106_2$ to thereby establish a geometric measurement (e.g., triangulation) therebetween.

In one implementation, each reference node $106_1, 106_2$ may be integrated as part of a handheld device, wherein learning the at least one physical dimension (e.g., length of arm span) of the user comprises moving the handheld device between a first position proximate to one outstretched arm of the user and a second position proximate to the other outstretched arm of the user. Determining arm span of the user may include prompting the user to physically lift each arm until parallel to ground level to measure arm span of the user, which comprises the distance between each hand or fingers of each hand when both arms are outstretched from the body and parallel with the ground.

In another implementation, a first reference node $106_1$ may be integrated as part of a first handheld device, and a second reference node $106_2$ may be integrated as part of a second handheld device, wherein learning the at least one physical dimension (e.g., length of arm span) of the user comprises holding the first handheld device at a first position proximate to one hand of the user and holding the second handheld device at a second position proximate to the other hand of the user. Determining arm span of the user may include prompting the user to physically lift each arm until parallel to ground level to measure arm span of the user, which comprises the distance between each hand or fingers of each hand when both arms are outstretched from the body and parallel with the ground.

In another example, referring to FIG. 3C, the apparatus 102 may determine at least one physical dimension (e.g., height) of the user by learning the at least one physical dimension of the user from another node map 322 having at least one reference node $106_1$ positioned proximate to ground level and at least one other reference node $106_2$ positioned proximate to the physical height of the user. The apparatus 102 may be configured to determine a range or distance between the apparatus 102 and each reference node $106_1, 106_2$ to thereby establish a geometric measurement (e.g., triangulation) therebetween.

In one implementation, each reference node $106_1, 106_2$ may be integrated as part of a handheld device, wherein learning the at least one physical dimension (e.g., height) of the user comprises moving the handheld device between a first position proximate to ground level and a second position proximate to the physical height of the user. Determining height of the user may include prompting the user to physically position the handheld device at ground level to obtain a first reference point at ground level and then prompting the user to physically position the handheld device proximate to the user's head to obtain a second reference point at the physical height of the user.

In another implementation, a first reference node $106_1$ may be integrated as part of a first handheld device, and a second reference node $106_2$ may be integrated as part of a second handheld device, wherein learning the at least one physical dimension (e.g., height) of the user comprises holding the first handheld device at a first position proximate to ground level and holding the second handheld device at a second position proximate to the top of the head of the user. Determining height of the user may include prompting the user to physically position the first handheld device at ground level to obtain a first reference point at ground level and then prompting the user to physically position the second handheld device proximate to the head of the user to obtain a second reference point at the physical height of the user.

In an aspect of the disclosure, the apparatus 102 is configured to communicate with at least one of the reference nodes $106_1$, $106_2$ to obtain body positioning data relating to the relative position of the other reference nodes between the body parts of the user and provide body tracking based on the body positioning data. In an example, the reference nodes $106_1$, $106_2$ are configured to communicate with each other to transfer body positioning data therebetween, and at least one of the reference nodes, such as reference node $106_1$, is configured to communicate with the apparatus 102 so that the apparatus obtains the body positioning data relating to relative position between the body parts of the user.

It will be appreciated that one or more of the reference nodes $106_1$, $106_2$, . . . , $106n$ may be positioned anywhere proximate to the user's body or body parts (e.g., hands, feet, head, abdomen, shoulders, etc.) to determine and/or obtain one or more physical dimensions of the user to scale user gestures according to the user's physical dimensions.

It will be appreciated that any information related to a user including user physical dimensions, user movements, user movement parameters, user scaling parameters, user scaling parameters, any and all relationships between user physical dimensions and user movements, history of user physical dimensions, and history of user movements may be stored as part of a computer readable medium.

Figure 3D:
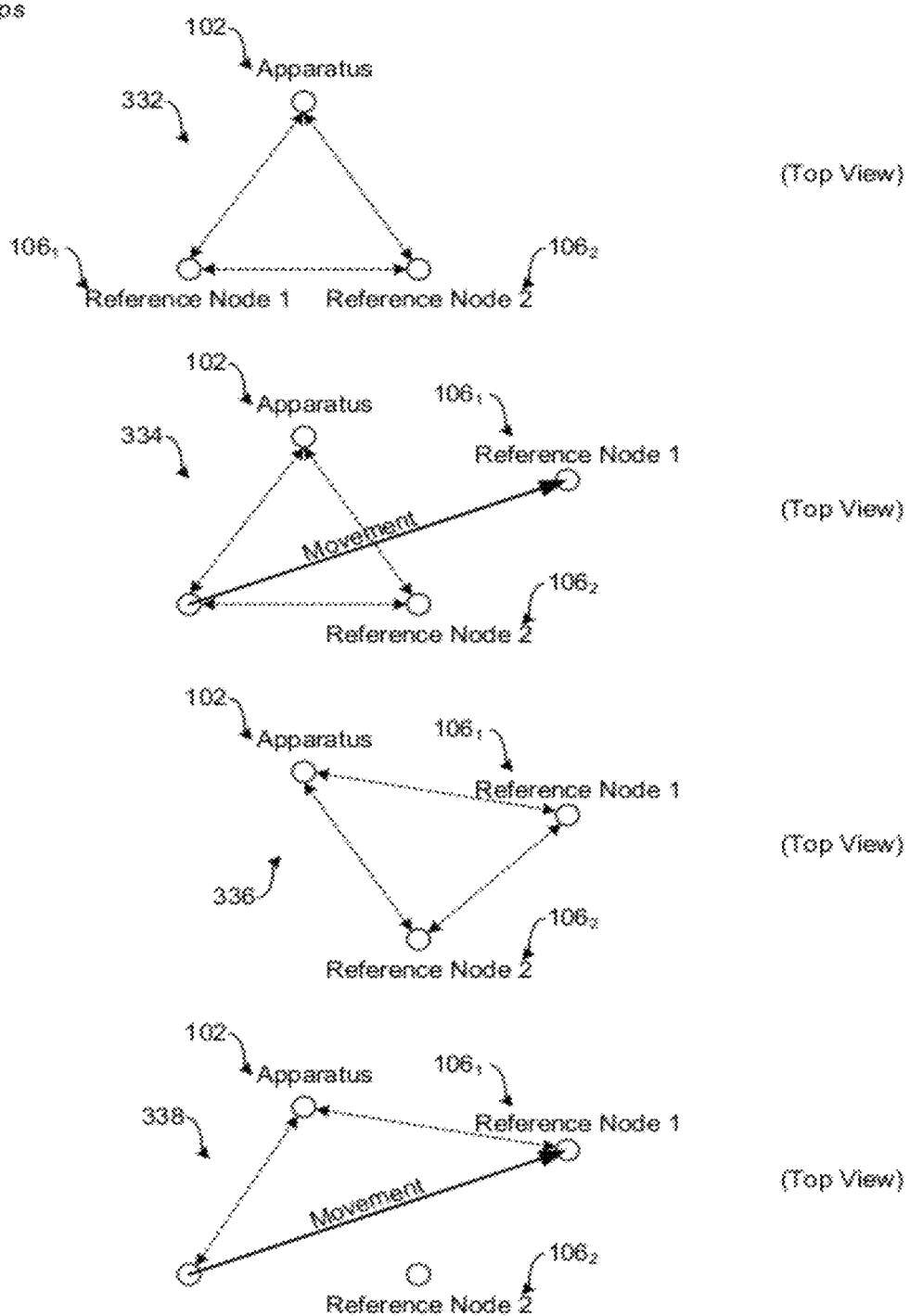

FIG. 3D is a conceptual diagram illustrating an example of the apparatus 102 and the remote system 104 being configured to determine at least one movement of the user by utilizing one or more reference nodes $106_1$, $106_2$, . . . , $106n$.

For example, referring to FIG. 3D, the apparatus 102 may determine at least one movement of the user by learning the at least one movement of the user from changes in node maps 332, 334, 336, 338, which identify movement of at least one reference node $106_1$ in reference to the apparatus 102. The apparatus 102 may be configured to define movement as a change in position of at least one reference node $106_1$ in reference to the position of the apparatus 102 and the position of at least one other reference node $106_2$. However, the apparatus 102 may be configured to define movement as a change in position of at least one reference node $106_1$ in reference to only the position of the apparatus 102.

Referring to node map 332 of FIG. 3D, the apparatus 102 may be configured to calculate a range or distance between the apparatus 102 and each reference node $106_1$, $106_2$ to thereby establish a first geometric measurement (e.g., triangulation) therebetween. The node map 332 refers to a first node configuration of the apparatus 102 in relation to the reference nodes $106_1$, $106_2$. Referring to node map 334, the user generates movement by moving the first reference node $106_1$ to another position to establish a second node configuration as shown by node map 336. Referring to node map 336, the apparatus 102 is configured to calculate another range or distance between the apparatus 102 and each reference node $106_1$, $106_2$ to thereby establish a second geometric measurement (e.g., triangulation) therebetween. The movement range or distance may be determined by calculating the change in position. As such, referring to node map 338, the apparatus 102 is configured to calculate still another range or distance between the apparatus 102 and the change in position of the reference node $106_1$ to thereby establish a third geometric measurement (e.g., triangulation) therebetween, which results in determining the range or distance of movement.

It will be appreciated that any information related to node maps including node maps corresponding to user physical dimensions, user movements, user movement parameters, user scaling parameters, user scaling parameters, any and all relationships between user physical dimensions and user movements, history of user physical dimensions, and history of user movements may be stored as part of a computer readable medium.

As described herein, user gestures may originate from any user body motion, movement, and/or pose, and user gestures include full body motion, movement, and/or pose and any body part motion, movement, and/or pose. For example, user gestures may include hand movements (e.g., punch, chop, lift, etc.), foot movements (e.g., kick, knee bend, etc.), head movements (e.g., head shake, nod, etc.), and/or body movements (e.g., jumping, kneeling, lying down, etc.).

The apparatus 102 may be configured to determine user gestures as 2-dimensional and 3-dimensional spatial positioning of at least one body point (e.g., as defined by a node). The apparatus 102 may be configured to translate changes in 2-dimensional and 3-dimensional spatial positioning of a body point into a user gesture, which may be referred to as body motion, body movement, and/or changes between body poses. The apparatus 102 may be configured to determine 2-dimensional and 3-dimensional spatial positioning of a body point relevant to a node on a user's body and/or a node on another user's body. The apparatus 102 may be configured to determine 2-dimensional and 3-dimensional spatial positioning of a body point relevant to the apparatus 102.

The apparatus 102 may be configured to determine user gestures (e.g., body motion, movement, and/or pose) by obtaining one or more physical dimensions that are between at least two body parts of the user (e.g., wrist and foot). The apparatus 102 may be configured to determine user gestures (e.g., body motion, movement, and/or pose) by obtaining one or more physical dimensions that are between at least two body parts of separate users (e.g., a distance between hands of different users).

The apparatus 102 may be configured to determine user gestures by capturing signals from one or more remote ranging sensors that cover ranging (e.g., distance) between at least two body points on the user's body. The apparatus 102 may be configured to determine user gestures by capturing signals from one or more remote ranging sensors from a handheld device and/or a wearable device, belt, or harness that may be attached to the body, a body part, and/or as part of clothing.

Figure 3E:
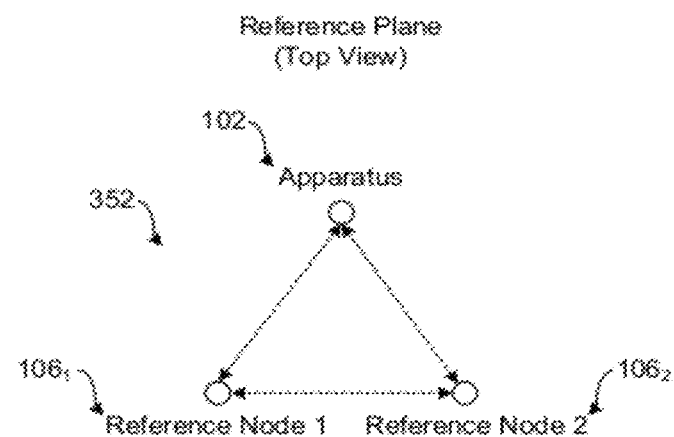
FIGS. 3E-3G show examples of node maps including a reference plane, in accordance with aspects of the disclosure.
Figure 3F:
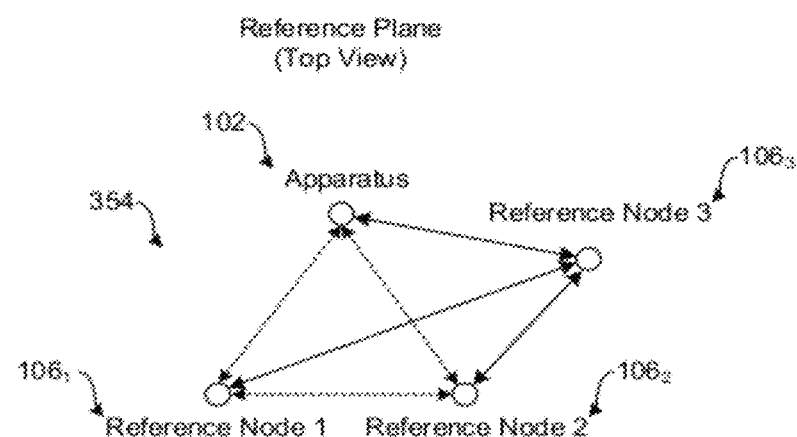

FIGS. 3E-3F are conceptual diagrams illustrating examples of the apparatus 102 and the remote system 104 being configured to determine body positioning data relating to a user by utilizing one or more reference nodes $106_1$, $106_2$, . . . , $106n$. In one aspect of the disclosure, the apparatus 102 and one or more reference nodes $106_1$, $106_2$, . . . , $106n$ may be utilized by the apparatus 102 to define a reference plane on the body of the user.

For example, referring to FIG. 3E, the apparatus 102 may determine body positioning data related to the user by defining a reference plane from a node map 352, which may include the distance between the apparatus 102 and reference nodes $106_1$, $106_2$ positioned proximate to the body of the user. The apparatus 102 may be configured to determine the reference plane based on a distance and angles between the apparatus 102 and each reference node $106_1$, $106_2$ to thereby establish a geometric measurement (e.g., triangulation) therebetween. The apparatus 102 and the reference nodes $106_1$, $106_2$ may be worn on the body of the user, such as, for example, at the waist of the user. The apparatus 102 and each reference node $106_1$, $106_2$ may be worn by the user as clothing, a belt, a harness, etc., or the apparatus 102 and each reference node $106_1$, $106_2$ may be attached to the user's body by some other means. The apparatus 102 may be worn by the user proximate to a front part of the user's waist, a first reference node $106_1$ may be worn by the user proximate to one side of the user's waist, and a second reference node $106_2$ may be worn by the user proximate to the other side of the user's waist. In this arrangement, the apparatus 102 and references nodes $106_1$, $106_2$ may be configured to define the reference plane proximate to the user's waist and may further define body parts in their respective positions proximate to the user's waist.

In another example, referring to FIG. 3F, the apparatus 102 may determine body positioning data related to the user by defining a reference plane and at least one additional node from a node map 354, which may include the distance between the apparatus 102 and reference nodes $106_1$, $106_2$ positioned proximate to the body of the user, and the distance of the apparatus 102 and each reference node $106_1$, $106_2$ to the additional node $106_3$ positioned proximate to a body part of the user. The apparatus 102 may be configured to determine the reference plane based on a distance and angles between the apparatus 102 and the first and second reference nodes $106_1$, $106_2$ to thereby establish a geometric measurement (e.g., triangulation) therebetween. The apparatus 102 may be further configured to establish another geometric measurement (e.g., triangulation) between a third reference node $106_3$ and the apparatus 102 and the first and second reference nodes $106_1$, $106_2$. The apparatus 102 and the first and second reference nodes $106_1$, $106_2$ may be worn on the body of the user, such as, for example, at the waist of the user to define the reference plane, as described in reference to FIG. 3E. In this arrangement, the apparatus 102 and references nodes $106_1$, $106_2$ may be configured to define the reference plane proximate to the user's waist. The third reference node $106_3$ may be worn proximate to a body part (e.g., head, hand, foot, knee, etc.) of the user, and the apparatus 102 may determine a 2-Dimensional or 3-Dimensional position of the third reference node $106_3$ in relation to the reference plane. Accordingly, the apparatus 102 is configured to obtain and/or determine body positing data of at least one body part in relation to a reference plane defined on the body.

It will be appreciated that one or more of the reference nodes $106_1$, $106_2$, $106_3$, . . . , $106n$ may be positioned anywhere proximate to the user's body or body parts (e.g., hands, feet, head, abdomen, waist, shoulders, etc.) to obtain and/or determine at least one body part in relation to the body according to the user's physical dimensions.

It will be appreciated that any information related to a user including user physical dimensions, user movements, user movement parameters, user scaling parameters, user scaling parameters, any and all relationships between user physical dimensions and user movements, history of user physical dimensions, and history of user movements may be stored as part of a computer readable medium.

Figure 3G:
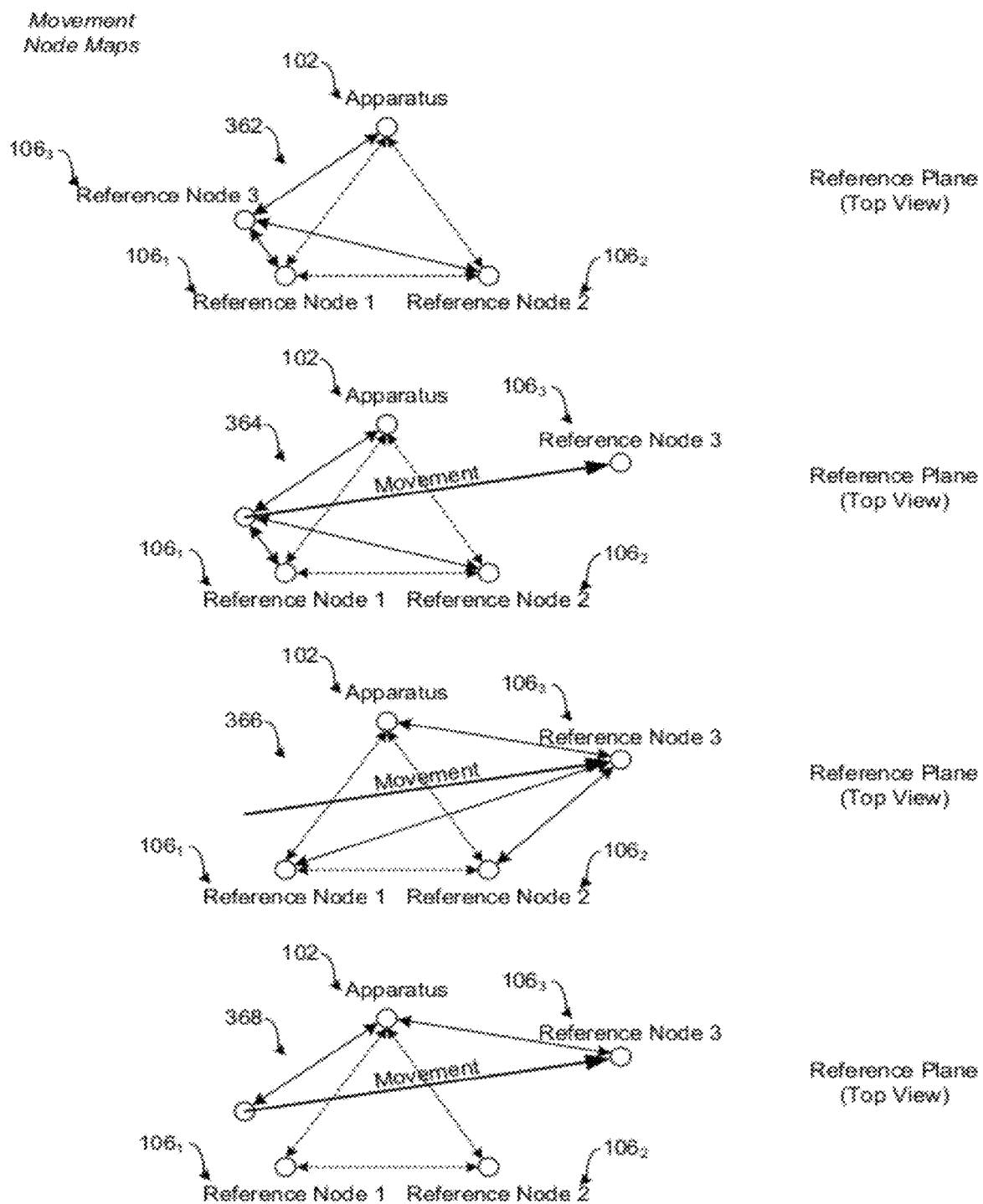
Figure 3H:
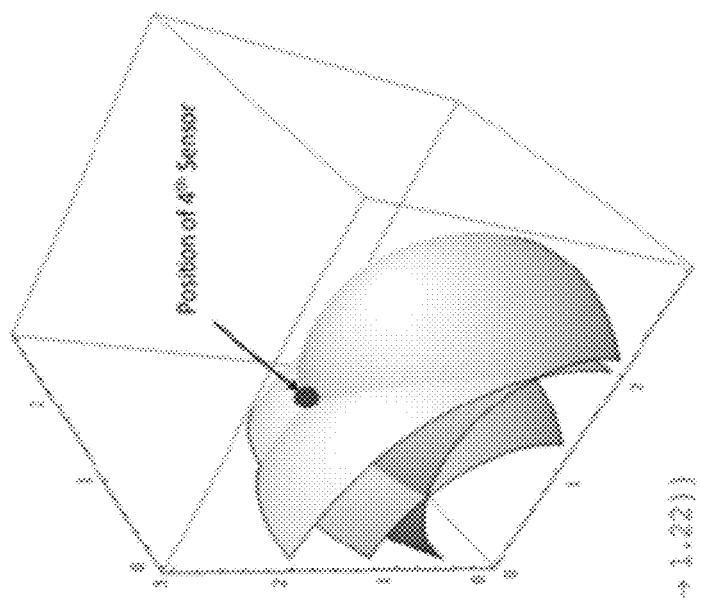
FIG. 3H shows various examples of equations for tracking orientation, in accordance with aspects of the disclosure.

FIG. 3G is a conceptual diagram illustrating an example of the apparatus 102 and the remote system 104 being configured to determine at least one movement of the user by utilizing one or more reference nodes $106_1$, $106_2$, $106_3$, . . . , $106n$.

For example, referring to FIG. 3G, the apparatus 102 may determine at least one movement of the user by learning the at least one movement of the user from changes in node maps 362, 364, 366, 368, which identify movement of at least one reference node $106_3$ in reference to the apparatus 102 and first and second nodes $106_1$, $106_2$. The apparatus 102 may be configured to define movement as a change in position of the third reference node $106_3$ in reference to the position of the apparatus 102 and the position of the first and second reference nodes $106_1$, $106_2$. However, the apparatus 102 may be configured to define movement as a change in position of the third reference node $106_3$ in reference to only the position of the apparatus 102.

Referring to node map 362 of FIG. 3G, the apparatus 102 may be configured to calculate distance and angles between the apparatus 102 and each reference node $106_1$, $106_2$ to thereby establish a first geometric measurement (e.g., triangulation) therebetween for defining the reference plane. The apparatus 102 may be further configured to calculate another geometric measurement (e.g., triangulation) between the third reference node $106_3$ and the apparatus 102 and the first and second reference nodes $106_1$, $106_2$. The node map 362 refers to a first node configuration of the apparatus 102 in relation to the reference nodes $106_1$, $106_2$, $106_3$.

Referring to node map 364, the user generates movement by moving the third reference node $106_3$ to another position to establish a second node configuration as shown by node map 366. Referring to node map 366, the apparatus 102 may be further configured to calculate another geometric measurement (e.g., triangulation) between the third reference node $106_3$ and the apparatus 102 and the first and second reference nodes $106_1$, $106_2$. The node map 362 refers to a second node configuration of the apparatus 102 in relation to the reference nodes $106_1$, $106_2$, $106_3$. As such, referring to node map 368, the apparatus 102 is configured to calculate still another distance and angles between the apparatus 102 and the change in position of the third reference node $106_3$ to thereby calculate another geometric measurement (e.g., triangulation) therebetween, which results in tracking the distance, angle and direction of movement of the third reference node $106_3$.

In an aspect of the disclosure, the apparatus 102 is configured to communicate with at least one of the reference nodes $106_1$, $106_2$, $106_3$ to obtain ranging measurements, including geometric measurements, relating to the relative position of the other reference nodes. In an example, the reference nodes $106_1$, $106_2$, $106_3$ are configured to communicate with each other to transfer ranging measurements therebetween, and at least one of the reference nodes, such as reference node $106_1$, is configured to communicate with the apparatus 102 so that the apparatus 102 obtains the ranging measurements relating to relative position between the reference nodes $106_1$, $106_2$, $106_3$.

In reference to FIGS. 1A-1C, the apparatus 102 may be configured to determine range and/or angular position between sensors (i.e., reference nodes $106_1$, $106_2$, . . . , $106n$) worn on a body with various RF techniques including monitoring signal strength, monitoring signal attenuation, time of flight of a single signal with timing synchronization, round-trip delay, magnetic field sensing, etc. In one example, the apparatus 102 may be configured to determine range and/or angular position between sensors (i.e., reference nodes $106_1$, $106_2$, . . . , $106n$) by a round-trip delay of a multiple signals sent to each sensor (i.e., reference nodes $106_1$, $106_2$, . . . , $106n$) and/or round-trip delay of a single signal sent through multiple sensors (i.e., reference nodes $106_1$, $106_2$, . . . , $106n$). The body positioning data may include data and information related to ranging and/or angular position between the apparatus 102 and each of the sensors (i.e., reference nodes $106_1$, $106_2$, . . . , $106n$) to provide body tracking based on the body positioning data. The body positioning data may include data and information related to ranging and/or angular position between each of the sensors (i.e., reference nodes $106_1$, $106_2$, . . . , $106n$) and a reference plane defined by one or more of the sensors (i.e., reference nodes $106_1$, $106_2$, . . . , $106n$) to provide body tracking based on the body positioning data.

It will be appreciated that any information related to node maps including node maps corresponding to user physical dimensions, user movements, user movement parameters, user scaling parameters, user scaling parameters, any and all relationships between user physical dimensions and user movements, history of user physical dimensions, and history of user movements may be stored as part of a computer readable medium.

As described herein, user gestures may originate from any user body motion, movement, and/or pose, and user gestures include full body motion, movement, and/or pose and any body part motion, movement, and/or pose. For example, user gestures may include hand movements (e.g., punch, chop, lift, etc.), foot movements (e.g., kick, knee bend, etc.), head movements (e.g., head shake, nod, etc.), and/or body movements (e.g., jumping, kneeling, lying down, etc.).

The apparatus 102 may be configured to determine user gestures as 2-dimensional and 3-dimensional spatial positioning of at least one body point (e.g., as defined by a node). The apparatus 102 may be configured to translate changes in 2-dimensional and 3-dimensional spatial positioning of a body point into a user gesture, which may be referred to as body motion, body movement, and/or changes between body poses. The apparatus 102 may be configured to determine 2-dimensional and 3-dimensional spatial positioning of a body point relevant to a node on a user's body and/or a node on another user's body. The apparatus 102 may be configured to determine 2-dimensional and 3-dimensional spatial positioning of a body point relevant to the apparatus 102.

The apparatus 102 may be configured to track user orientation by defining a reference plane on the body (e.g., waist) of the user and tracking at least one other reference node on a body part (e.g., hand) of the user in relation to the reference plane to obtain body positioning data. The apparatus 102 may be configured to track user orientation by capturing signals from one or more remote ranging sensors that cover ranging (e.g., distance) between at least two body points on the user's body. The apparatus 102 may be configured to track user orientation by capturing signals from one or more remote ranging sensors from the apparatus 102 and one or more reference nodes $106_1$, $106_2$, $106_3$ in a wearable device, belt, or harness that may be attached to the body, a body part, and/or as part of clothing.

The apparatus 102 may be configured to track user orientation and/or user gestures (e.g., body motion, movement, and/or pose) by determining and/or obtaining one or more physical dimensions that are between at least two body parts of the user (e.g., waist and hand, waist and foot, wrist and foot, etc.). The apparatus 102 may be configured to track user orientation and/or determine user gestures (e.g., body motion, movement, and/or pose) by obtaining one or more physical dimensions that are between at least two body parts of separate users, including, for example, a distance between reference planes defined on bodies of separate uses, a distance between waists, hands, feet, etc. of different users, etc.).

Figure 4:
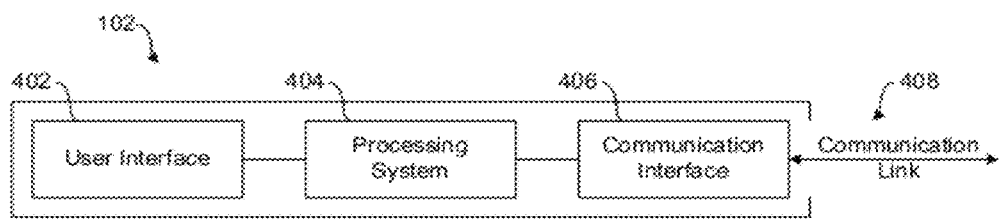
FIGS. 4-5 show examples of apparatuses suitable for implementing aspects of the disclosure.

FIG. 4 is a block diagram of an apparatus 102 suitable for implementing various aspects of the disclosure. In one embodiment, the apparatus 102 of FIG. 1C may be implemented with the apparatus 102 of FIG. 4.

In accordance with an aspect of the disclosure, the apparatus 102 provides a means for interacting with the user comprising, for example, a user interface 402. The user interface 402 may include the utilization of one or more of an input component (e.g., keyboard), a cursor control component (e.g., mouse or trackball), and image capture component (e.g., analog or digital camera). The user interface 402 may include the utilization of a display component (e.g., CRT or LCD).

In accordance with an aspect of the disclosure, the apparatus 102 comprises a processing system 404 that may be implemented with one or more processors. The one or more processors, or any of them, may be dedicated hardware or a hardware platform for executing software on a computer-readable medium. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In various implementations, the one or more processors may include, by way of example, any combination of microprocessors, microcontrollers, digital signal processors (DSPs), field programmable gate arrays (FPGAs), programmable logic devices (PLDs), state machines, gated logic, discrete hardware circuits, and other suitable processors configured to perform the various functionalities described throughout this disclosure.

In accordance with aspects of the disclosure, the functions described may be implemented in hardware, software, firmware, or any combination thereof. If implemented in software, the functions may be stored on or transmitted over as one or more instructions or code on a computer-readable medium. In various implementations, the computer-readable medium may include both computer storage media and communication media including any medium that facilitates transfer of a computer program from one place to another. A storage media may be any available media that can be accessed by a computer or processor. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects, computer readable medium may comprise non-transitory computer readable medium (e.g., tangible media). In addition, in some aspects, computer readable medium may comprise transitory computer readable medium (e.g., a signal). Combinations of the above should also be included within the scope of computer-readable media. The computer-readable medium may be embodied in a computer-program product. By way of example, a computer-program product may include a computer-readable medium in packaging materials.

In an aspect of the disclosure, the processing system 404 provides a means for communicating with the reference nodes $106_1, 106_2, \ldots, 106n$ that may be worn on body parts of a user to obtain body positioning data relating to relative position between the body parts. The processing system 404 further provides a means for providing body tracking based on the body positioning data, which may relate to ranging and/or angular position between each of the reference nodes $106_1, 106_2, \ldots, 106n$ and a reference plane defined by one or more of the reference nodes (e.g., as described in FIGS. 3E-3F). The processing system 404 may provide a means for generating at least a portion of the body positioning data. The processing system 404 may provide a means for providing body tracking that is configured to create a historical record of the one or more physical dimensions of the body and/or the one or more movements of the body from the body positioning data. The processing system 404 may provide a means for providing body tracking that is configured to create a historical record of a relationship between the one or more physical dimensions of the body and the one or more movements of the body from the body positioning data. The apparatus 102 may be configured to provide a means for generating reference data relating to relative position of at least one body part. The sensor 108 of FIG. 1C is an example of a sensing means.

In accordance with an aspect of the disclosure, the apparatus 102 comprises a communication interface 406 having one or more communication components that may be implemented to receive and/or transmit signals via one or more communication links 408. For example, the communication interface 406 may comprise a short range communication component, such as a receiver, a transmitter, a receiver and a transmitter, or a transceiver. As such, the communication interface 406 may utilize a wireless communication component and an antenna, such as a mobile cellular device, a wireless broadband device, a wireless satellite device, or various other types of wireless communication devices including radio frequency (RF), microwave frequency (MWF), and/or infrared frequency (IRF) devices adapted for wireless communication. The communication interface 406 may be configured to receive information from a user, and/or the communication interface 406 may be configured to transmit information to a user. In another example, the communication interface 406 may comprise a network interface component (e.g., modem or Ethernet card) to receive and transmit wired and/or wireless signals. The communication interface 406 may be adapted to interface and communicate with various types of networks, such as local area networks (LAN), wide area networks (WAN) including the Internet, public telephone switched networks (PTSN), and/or various other wired or wireless networks, including telecommunications, mobile, and cellular phone networks. The communication interface 406 may be adapted to interface with a DSL (e.g., Digital Subscriber Line) modem, a PSTN (Public Switched Telephone Network) modem, an Ethernet device, and/or various other types of wired and/or wireless network communication devices adapted for wired and/or wireless communication. The communication interface 406 may be configured as a network gateway, such as an Internet gateway.

In an aspect of the disclosure, the apparatus 102 provides a means for communicating comprising, for example, the communication interface 406 to communicate with the remote system 104 including one or more reference nodes $106_1, 106_2, \ldots, 106n$ that may be worn on body parts to obtain body positioning data relating to relative position between the body parts. The communication component 406 may send the received body positioning data to the processing system 404. The communication interface 406 may include a means for receiving at least a portion of the body positioning data from one or more of the reference nodes $106_1, 106_2, \ldots, 106n$. The communication interface 406 may include a means for communicating with the reference nodes $106_1, 106_2, \ldots, 106n$ when worn on body parts of multiple users to obtain the body positioning data. In various examples, the communication interface 406 comprises a means for communicating, which may comprise a receiver, a transmitter, a receiver and a transmitter, or a transceiver.

The apparatus 102 may provide a means for generating reference data to relative position of at least one body part in relation to the apparatus 102, wherein the means for generating reference data comprises a sensor (e.g., the sensor 108 of FIG. 1C).

Figure 5:
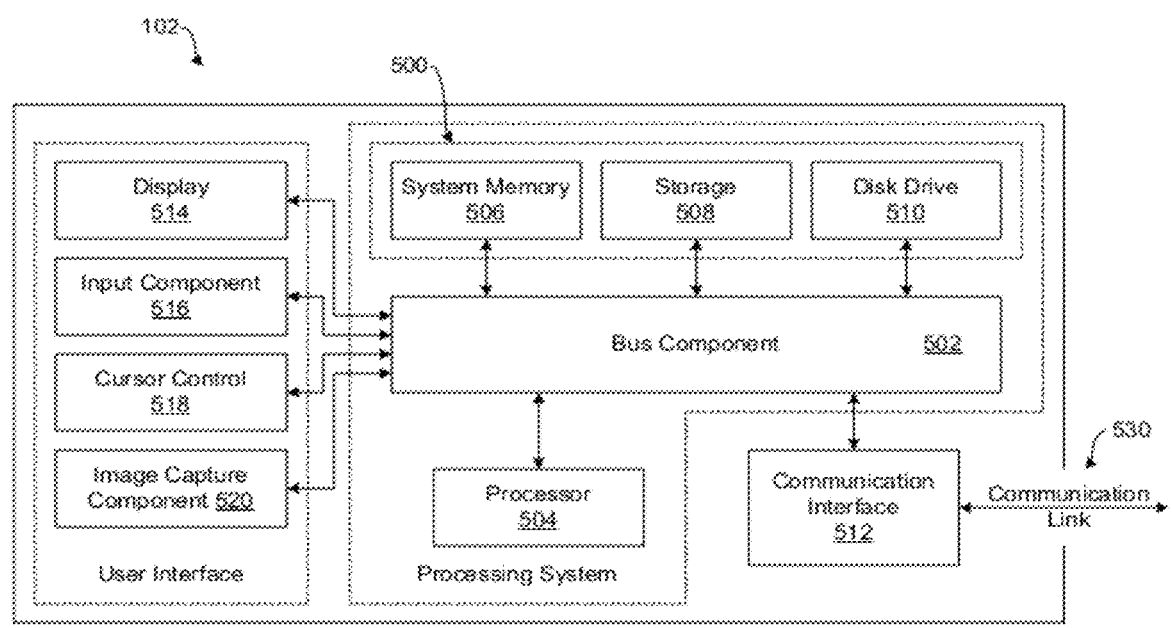

FIG. 5 is a block diagram of an apparatus 102 suitable for implementing various aspects of the disclosure. The apparatus 102 may comprise a wired or wireless computing/processing/communication device (e.g., laptop, PC, PDA, mobile phone, game console, digital media player, television, etc.) capable of communicating with other wired or wireless devices (e.g., the remote system 104 and one or more of the reference nodes $106_1, 106_2, \ldots, 106n$).

In accordance with various aspects of the disclosure, the apparatus 102 includes a processing system having a processor 504 and a bus 502 or other communication mechanism for communicating information, which interconnects subsystems and components, such as the processor 504 (e.g., processor, micro-controller, digital signal processor (DSP), etc.) and one or more computer readable media 500. The computer readable media 500 may include one or more of system memory 506 (e.g., RAM), static storage 508 (e.g., ROM), and disk drive storage 510 (e.g., magnetic or optical). The apparatus 102 includes a communication interface 512 (e.g., one or more wired or wireless communication components for short range communication and/or network communication), display 514 (e.g., CRT or LCD), input component 516 (e.g., keyboard), cursor control 518 (e.g., mouse or trackball), and image capture component 520 (e.g., analog or digital camera). The disk drive 510 may comprise a database having one or more disk drives. It should be appreciated that any one of the memory components 506, 508, 510 may comprise a computer readable medium and be integrated as part of the processing component 504 to store computer readable instructions or code related thereto for performing various aspects of the disclosure. The communication interface 512 may utilize a wireless communication component and an antenna to communicate over one or more communication links 530.

In accordance with aspects of the disclosure, the apparatus 102 performs specific operations by the processor 504 executing one or more sequences of one or more instructions contained in the computer readable media 500, such as the system memory 506. Such instructions may be read into the system memory 506 from another computer readable medium, such as the static storage 508 and/or the disk drive 510. Hard-wired circuitry may be used in place of or in combination with software instructions to implement the disclosure.

Logic may be encoded in the computer readable medium 500, which may refer to any medium that participates in providing instructions to the processor 504 for execution. Such a medium may take many forms, including but not limited to, non-volatile media and volatile media. In various implementations, non-volatile media includes optical or magnetic disks, such as the disk drive 510, and volatile media includes dynamic memory, such as the system memory 506. In one aspect, data and information related to execution instructions may be transmitted to the apparatus 102 via transmission media, such as in the form of acoustic or light waves, including those generated during radio wave, micro wave, and infrared data communications. In various implementations, transmission media may include coaxial cables, copper wire, and fiber optics, including wires that comprise the bus 502

Some common forms of computer readable media 500 includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various aspects of the disclosure, execution of instruction sequences to practice the disclosure may be performed by the apparatus 102. In various other aspects of the disclosure, a plurality of apparatuses 102 coupled by the one or more communication links 530, such as a short range wired or wireless communication medium, and/or network based communication including LAN, WLAN, PTSN, and/or various other wired or wireless communication networks, including telecommunications, mobile, and cellular phone networks) may perform instruction sequences to practice the disclosure in coordination with one another.

The apparatus 102 may transmit and receive messages, data, information and instructions, including one or more programs (i.e., application code) through the one or more communication links 530 and the communication interface 512. Received program code may be executed by the processor 504 as received and/or stored in the disk drive 510 or some other non-volatile memory or storage component for execution.

Where applicable, various aspects provided by the disclosure may be implemented using hardware, software, or combinations of hardware and software. Also, where applicable, the various hardware components and/or software components set forth herein may be combined into composite components comprising software, hardware, and/or both without departing from aspects of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein showings therein are for purposes of illustrating aspects of the disclosure and not for purposes of limiting the same.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for data processing comprising:
a processing system configured to communicate through a wired or wireless connection with at least one of a plurality of reference nodes worn on body parts of a body to obtain body positioning data relating to relative position between the body parts, and provide body tracking based on the body positioning data; and
a single communication interface configured to provide the wired or wireless connection, the single communication interface capable of receiving node data from the plurality of reference nodes sufficient for obtaining the body positioning data,
wherein the body positioning data relates to ranging between each of the reference nodes and a reference plane defined by one or more of the reference nodes, and
wherein the single communication interface is configured to receive, from a first of the reference nodes worn on the body parts, a node signal that includes first node data of the first reference node and second node data of a second of the reference nodes worn on the body parts, the first and second node data sufficient for obtaining at least a portion of the body positioning data.

2. The apparatus of claim 1, wherein the apparatus comprises a game console, and wherein the processing system is further configured to support one or more gaming applications by providing the body tracking based on the body positioning data.

3. The apparatus of claim 1, wherein the apparatus is configured to be supported by attachment to the body using one or more of clothing, a belt, and a harness.

4. The apparatus of claim 1, further comprising at least one sensor configured to generate reference data relating to relative position of at least one body part in relation to the apparatus.

5. The apparatus of claim 1, wherein the body positioning data further relates to angular position between each of the reference nodes and the reference plane.

6. The apparatus of claim 1, wherein the processing system is configured to communicate with at least two of the reference nodes when worn on body parts of multiple users to obtain the body positioning data.

7. The apparatus of claim 1, wherein the body positioning data comprises one or more physical dimensions of the body.

8. The apparatus of claim 1, wherein the body positioning data comprises data related to one or more movements of the body.

9. The apparatus of claim 1, wherein the body positioning data comprises one or more physical dimensions of the body, data related to one or more movements of the body, and a relationship between the one or more physical dimensions of the body and the one or more movements of the body.

10. The apparatus of claim 1, wherein the body positioning data comprises one or more physical dimensions of the body, and wherein the processing system is configured to create a historical record of the one or more physical dimensions of the body from the body positioning data.

11. The apparatus of claim 1, wherein the body positioning data comprises data related to one or more movements of the body, and wherein the processing system is configured to create a historical record of the body positioning data related to the one or more movements of the body.

12. The apparatus of claim 1, wherein the processing system is configured to generate at least the portion of the body positioning data.

13. The apparatus of claim 1, wherein the processing system is configured to receive at least the portion of the body positioning data from the first of the reference nodes.

14. A method for data processing comprising:
communicating through a wired or wireless connection with at least one of a plurality of reference nodes worn on body parts of a body to obtain body positioning data relating to relative position between the body parts, wherein the wired or wireless connection is provided by a single communication interface, the single communication interface capable of receiving node data from the plurality of reference nodes sufficient for obtaining the body positioning data; and
providing body tracking based on the body positioning data,
wherein the body positioning data relates to ranging between each of the reference nodes and a reference plane defined by one or more of the reference nodes, and
wherein the single communication interface is configured to receive, from a first of the reference nodes worn on the body parts, a node signal that includes first node data of the first reference node and second node data of a second of the reference nodes worn on the body parts, the first and second node data sufficient for obtaining at least a portion of the body positioning data.

15. The method of claim 14, wherein the body positioning data further relates to angular position between each of the reference nodes and the reference plane.

16. The method of claim 14, wherein communicating with the first reference node includes communicating with at least the second reference node and a third of the reference nodes worn on body parts of multiple users to obtain the body positioning data.

17. The method of claim 14, wherein the body positioning data comprises one or more physical dimensions of the body.

18. The method of claim 14, wherein the body positioning data comprises data related to one or more movements of the body.

19. The method of claim 14, wherein the body positioning data comprises one or more physical dimensions of the body, data related to one or more movements of the body, and a relationship between the one or more physical dimensions of the body and the one or more movements of the body.

20. The method of claim 14, wherein the body positioning data comprises one or more physical dimensions of the body, and wherein providing the body tracking comprises creating a historical record of the one or more physical dimensions of the body from the body positioning data.

21. The method of claim 14, wherein the body positioning data comprises data related to one or more movements of the body, and wherein providing the body tracking comprises creating a historical record of the body positioning data related to the one or more movements of the body from the body positioning data.

22. The method of claim 14, further comprising generating at least the portion of the body positioning data.

23. The method of claim 14, further comprising receiving at least the portion of the body positioning data from the first of the reference nodes.

24. An apparatus for data processing comprising:
means for communicating through a wired or wireless connection with at least one of a plurality of reference nodes worn on body parts of a body to obtain body positioning data relating to relative position between the body parts;
means for providing the wired or wireless connection with the plurality of reference nodes via a single communication interface, the single communication interface capable of receiving node data from the plurality of reference nodes sufficient for obtaining the body positioning data; and
means for providing body tracking based on the body positioning data,
wherein the body positioning data relates to ranging between each of the reference nodes and a reference plane defined by one or more of the reference nodes, and
wherein the single communication interface is configured to receive, from a first of the reference nodes worn on the body parts, a node signal that includes first node data of the first reference node and second node data of a second of the reference nodes worn on the body parts, the first and second node data sufficient for obtaining at least a portion of the body positioning data.

25. The apparatus of claim 24, wherein the apparatus comprises a game console, and wherein the apparatus is configured to execute one or more gaming applications.

26. The apparatus of claim 24, wherein the apparatus is configured to be supported by attachment to the body using one or more of clothing, a belt, and a harness.

27. The apparatus of claim 24, further comprising one or more sensors that provide reference data relating to relative position of at least one body part.

28. The apparatus of claim 24, wherein the body positioning data further relates to angular position between each of the reference nodes and the reference plane.

29. The apparatus of claim 24, wherein the means for communicating through a wired or wireless connection with the at least one of the reference nodes is configured to communicate with at least two of the reference nodes when worn on body parts of multiple users to obtain the body positioning data.

30. The apparatus of claim 24, wherein the body positioning data comprises one or more physical dimensions of the body.

31. The apparatus of claim 24, wherein the body positioning data comprises data related to one or more movements of the body.

32. The apparatus of claim 24, wherein the body positioning data comprises one or more physical dimensions of the body, data related to one or more movements of the body, and a relationship between the one or more physical dimensions of the body and the one or more movements of the body.

33. The apparatus of claim 24, wherein the body positioning data comprises one or more physical dimensions of the body, and wherein the means for providing body tracking is configured to create a historical record of the one or more physical dimensions of the body using the body positioning data.

34. The apparatus of claim 24, wherein the body positioning data comprises data related to one or more movements of the body, and wherein the means for providing body tracking is configured to create a historical record of the body positioning data related to the one or more movements of the body using the body positioning data.

35. The apparatus of claim 24, further comprising a plurality of sensors, including one or more sensors that provide at least another portion of the body positioning data.

36. The apparatus of claim 24, further comprising a short range communication receiver or transceiver that receives at least the portion of the body positioning data from the first reference node.

37. A non-transitory computer-readable medium comprising codes executable to cause an apparatus to:
communicate through a wired or wireless connection with at least one of a plurality of reference nodes worn on body parts of a body to obtain body positioning data relating to relative position between the body parts, wherein the wired or wireless connection is provided by a single communication interface, the single communication interface capable of receiving node data from the plurality of reference nodes sufficient for obtaining the body positioning data; and
provide body tracking based on the body positioning data, wherein the body positioning data relates to ranging between each of the reference nodes and a reference plane defined by one or more of the reference nodes, and
wherein the single communication interface is configured to receive, from a first of the reference nodes worn on the body parts, a node signal that includes first node data of the first reference node and second node data of a second of the reference nodes worn on the body parts, the first and second node data sufficient for obtaining at least a portion of the body positioning data.

38. A game console comprising:
a receiver configured to receive information from a user;
a processing system configured to communicate through a wired or wireless connection with at least one of a plurality of reference nodes worn on body parts of the user to obtain body positioning data relating to relative position between the body parts of the user, and provide body tracking of the user based on the body positioning data; and
a single communication interface configured to provide the wired or wireless connection, the single communication interface capable of receiving node data from the plurality of reference nodes sufficient for obtaining the body positioning data,
wherein the body positioning data relates to ranging between each of the reference nodes and a reference plane defined by one or more of the reference nodes, and
wherein the single communication interface is configured to receive, from a first of the reference nodes worn on the body parts, a node signal that includes first node data of the first reference node and second node data of a second of the reference nodes worn on the body parts, the first and second node data sufficient for obtaining at least a portion of the body positioning data.

39. The apparatus of claim 1, wherein the processing system is configured to communicate wirelessly using a radio frequency technology.

40. The apparatus of claim 1, wherein the processing system is configured to communicate using a peer-to-peer or mesh networking wireless protocol.

41. The method of claim 14, wherein communicating through wireless connection includes communicating through a radio.

42. The method of claim 14, wherein communicating through wireless connection includes using a wireless protocol.

43. The apparatus of claim 24, wherein the means for communicating through wireless connection comprises a radio.

44. The apparatus of claim 24, wherein the means for communicating through wireless connection is configured to use a wireless protocol to communicate with the first reference node.

45. The apparatus of claim 1, wherein the first reference node is configured to communicate with the second reference node and at least one other of plurality of reference nodes worn on the body parts.

46. The method of claim 14, wherein the first reference node is configured to communicate with the second reference node and at least one other of plurality of reference nodes worn on the body parts.

47. The apparatus of claim 24, wherein the first reference node is configured to communicate with the second reference node and at least one other of plurality of reference nodes worn on the body parts.

48. The non-transitory computer-readable medium of claim 37, wherein the first reference node is configured to communicate with the second reference node and at least one other of plurality of reference nodes worn on the body parts.

49. The game console of claim 38, wherein the first reference node is configured to communicate with the second reference node and at least one other of plurality of reference nodes worn on the body parts.

* * * * *